United States Patent
Nakamura

(10) Patent No.: US 9,612,705 B2
(45) Date of Patent: Apr. 4, 2017

(54) ELECTROCONDUCTIVE FILM

(71) Applicant: FUJIFILM Corporation, Tokyo (JP)

(72) Inventor: Hiroshige Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 18 days.

(21) Appl. No.: 14/845,482

(22) Filed: Sep. 4, 2015

(65) Prior Publication Data

US 2015/0378485 A1    Dec. 31, 2015

Related U.S. Application Data

(63) Continuation of application No. PCT/JP2014/054107, filed on Feb. 21, 2014.

(30) Foreign Application Priority Data

Mar. 8, 2013 (JP) .................................. 2013-046275

(51) Int. Cl.
| | | |
|---|---|---|
| *G06F 3/041* | (2006.01) | |
| *G06F 3/047* | (2006.01) | |
| *G06F 3/044* | (2006.01) | |
| *G09G 3/3208* | (2016.01) | |
| *G09G 3/36* | (2006.01) | |

(52) U.S. Cl.
CPC .............. *G06F 3/047* (2013.01); *G06F 3/044* (2013.01); *G09G 3/3208* (2013.01); *G09G 3/36* (2013.01);

(Continued)

(58) Field of Classification Search
CPC ........ G06F 3/044; G06F 3/047; G06F 3/3208; G09G 3/3208; G09G 3/36;

(Continued)

(56) References Cited

U.S. PATENT DOCUMENTS

| | | | |
|---|---|---|---|
| 2009/0219257 A1* | 9/2009 | Frey | ........................ G06F 3/044 345/173 |
| 2012/0031746 A1 | 2/2012 | Hwang et al. | |

(Continued)

FOREIGN PATENT DOCUMENTS

| | | |
|---|---|---|
| JP | 2011-513846 A | 4/2011 |
| JP | 2011-216377 A | 10/2011 |

(Continued)

OTHER PUBLICATIONS

International Search Report for PCT/JP2014/054107 dated May 27, 2014.

(Continued)

*Primary Examiner* — Jenny L Wagner
*Assistant Examiner* — Michael E Moats, Jr.
(74) *Attorney, Agent, or Firm* — Sughrue Mion, PLLC

(57) ABSTRACT

An electroconductive film includes a transparent conductive layer having a plurality of electrodes which extend in one direction. The electrodes have different electrode widths depending on the site, and are configured of a plurality of polygonal cells formed of fine metal wires. The sizes of the respective cells are not uniform. The average size of the cells is greater than or equal 1/30, and less than 1/3, of the narrowest width of the electrodes. The average size of the cells is uniform in the electrodes overall.

14 Claims, 12 Drawing Sheets

(52) U.S. Cl.
CPC .............. *G06F 2203/04112* (2013.01); *G09G 2300/0426* (2013.01); *G09G 2380/02* (2013.01)

(58) Field of Classification Search
CPC .... G09G 2300/0421; G09G 2300/0426; G02F 1/0316; G02F 1/134309; G02F 2001/1357; G02F 2001/134318
USPC .......................... 349/139, 141, 142, 143, 145
See application file for complete search history.

(56) References Cited

U.S. PATENT DOCUMENTS

| | | |
|---|---|---|
| 2012/0194441 A1 | 8/2012 | Frey |
| 2013/0028503 A1 | 1/2013 | Wakui et al. |
| 2013/0255998 A1 | 10/2013 | Iwami et al. |
| 2014/0285737 A1 | 9/2014 | Takahashi et al. |

FOREIGN PATENT DOCUMENTS

| | | |
|---|---|---|
| JP | 2012-119163 A | 6/2012 |
| JP | 2012-181815 A | 9/2012 |
| JP | 2012-533877 A | 12/2012 |
| JP | 2014-026510 A | 2/2014 |

OTHER PUBLICATIONS

International Preliminary Report on Patentability and Written Opinion, dated Sep. 17, 2015, issued in corresponding International Application No. PCT/JP2014/054107, 13 pages in English and Japanese.

\* cited by examiner

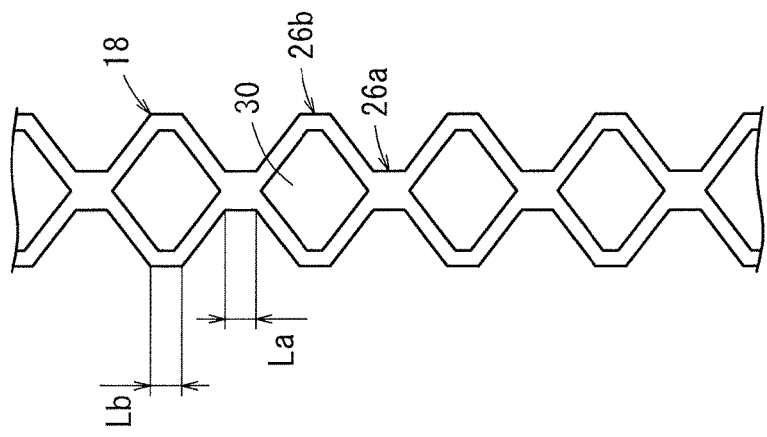
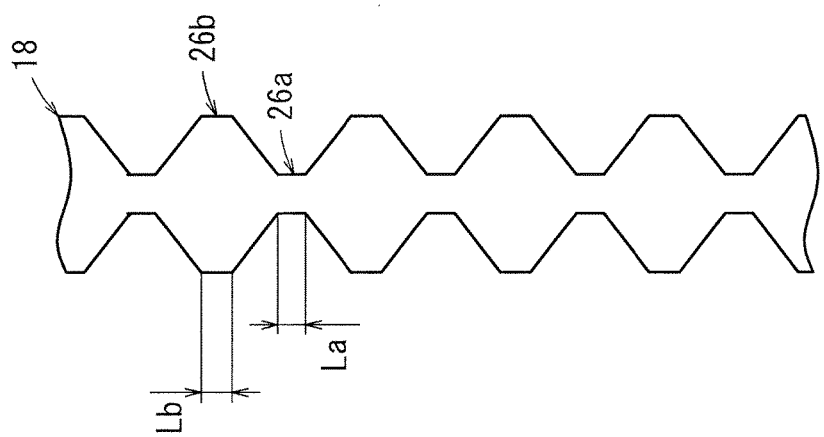
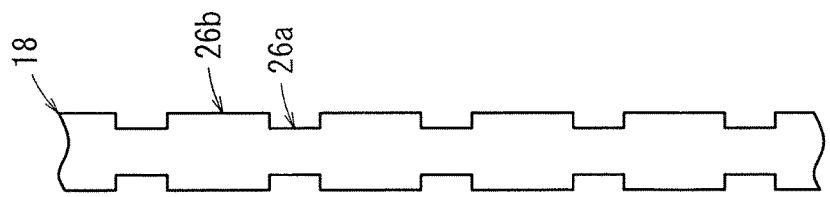

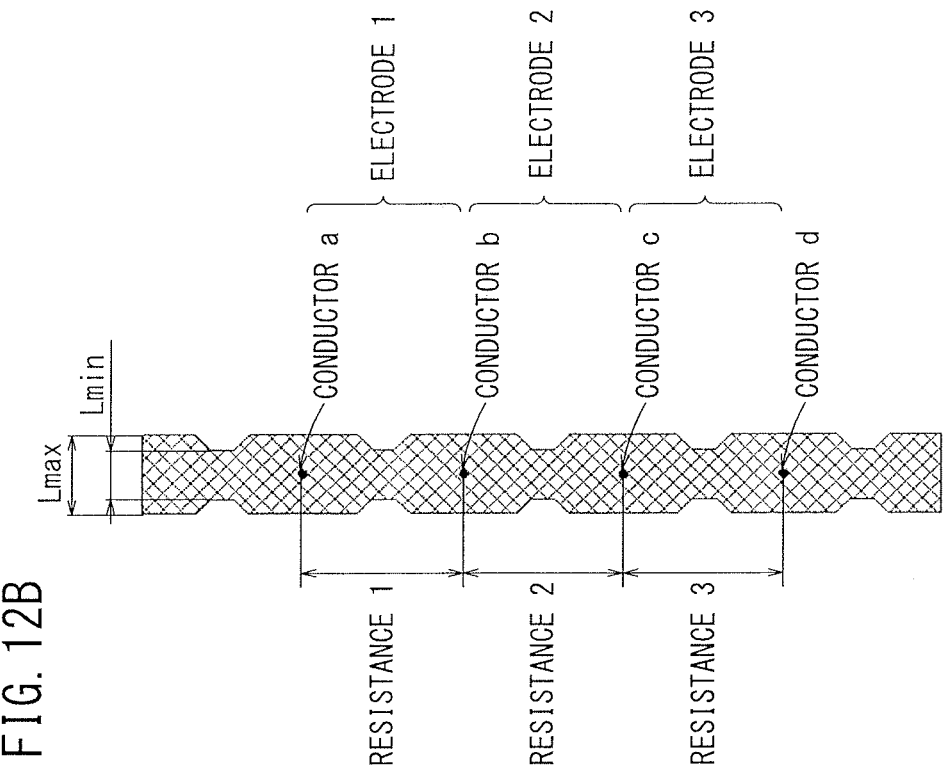
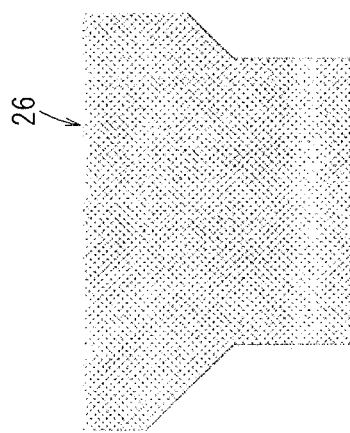

ELECTROCONDUCTIVE FILM

CROSS-REFERENCE TO RELATED APPLICATIONS AND PRIORITY CLAIM

This application is a Continuation of International Application No. PCT/JP2014/054107 filed on Feb. 21, 2014, which was published under PCT Article 21(2) in Japanese, which is based upon and claims the benefit of priority from Japanese Patent Application No. 2013-046275 filed on Mar. 8, 2013, the contents all of which are incorporated herein by reference.

TECHNICAL FIELD

The present invention relates to an electroconductive film, and more particularly to an electroconductive film suitable for use in a touch panel, for example.

BACKGROUND ART

Recently, touch panels have been attracting attention. Touch panels have primarily been applied to small-sized devices including portable digital assistants (PDAs), mobile phones, etc. However, it is considered that there will be a trend toward touch panels that are larger in size as such touch panels are applied more to personal computer displays, etc.

In view of such a future tendency, electrodes according to the background art have a large electric resistance because the electrodes are made of indium tin oxide (ITO). Therefore, as the sizes of touch panels that are used in applications become larger, the signal waveforms of currents flowing between the electrodes tend to have blunt edges, resulting in a problem in which the response speed (the elapsed time after a fingertip has touched the touch panel and until the touched position is detected) becomes lower.

It has been known to lower the surface resistance of a touch panel by constructing electrodes to have a number of juxtaposed grids made up of thin lines of metal (metal thin lines). Furthermore, in order to suppress a moire phenomenon caused by a regular pattern of grids, there have been proposed electroconductive films having a random pattern of metal thin lines (see, for example, Japanese Laid-Open Patent Publication No. 2011-513846 (PCT), Japanese Laid-Open Patent Publication No. 2012-181815, and Japanese Laid-Open Patent Publication No. 2012-119163).

The electroconductive film disclosed in Japanese Laid-Open Patent Publication No. 2011-513846 (PCT) includes mesh bars, which are connected respectively to a plurality of terminals, and line zones (electrically insulated zones) disposed between the mesh bars. In particular, the mesh bars include a plurality of randomly shaped cells.

The electroconductive film disclosed in Japanese Laid-Open Patent Publication No. 2012-181815 includes transparent electrode pattern portions and transparent insulation pattern portions, which are laid out alternately on the surface of a base, thereby reducing differences between optical properties of areas where the transparent electrode pattern portions are present and areas where the transparent electrode pattern portions are not present (i.e., areas where the transparent insulation pattern portions are present), and preventing the transparent electrode pattern portions from being visually perceived. Moreover, plural lands are disposed randomly at spaced intervals in the transparent insulation pattern portions in order to suppress generation of moire patterns.

The electroconductive film disclosed in Japanese Laid-Open Patent Publication No. 2012-119163 comprises an electroconductive film having mesh-like line members disposed on a base. A structural pattern, which has a design different from the mesh-like pattern, is superposed on the electroconductive film. Thereafter, a convolution operation is performed on the power spectrum as viewed in plan and human standard visual response properties. Each of respective integral values within a special frequency band, which is equal to or greater than 1/4 times the spatial frequency corresponding to the average line width of the line members, and which is equal to or less than 1/2 times the special frequency, is larger than the integral value at a null spatial frequency. As a result, even if multiple electroconductive films are stacked for use in touch panel applications, for example, noise interference (in the form of moire patterns) is prevented from being produced.

SUMMARY OF INVENTION

According to the electroconductive film disclosed in Japanese Laid-Open Patent Publication No. 2011-513846 (PCT), the cells, which make up the mesh bars that are connected to the terminals, are widely different in size. Cells that are greatest in size are as large as five of the cells that are smallest in size. Consequently, only one cell or two cells are present across the width of a mesh bar, which tends to make the electrical resistance of the mesh bar large. In this case, the time constant of the mesh bar increases, resulting in a problem in that the detection accuracy of the detection signal is reduced. Furthermore, variations in the layout of cells that are large in size and cells that are small in size are uneven. If an electroconductive film is applied to an electrostatic capacitance type of touch panel, then variations in resistance and electrostatic capacitance between areas that are used as electrodes are large. As a consequence, an integrated circuit (IC) for energizing the touch panel requires a circuit in order to carry out a processing operation for cancelling out such variations in resistance and electrostatic capacitance. Consequently, the burden on the IC tends to become unduly large.

According to the electroconductive film disclosed in Japanese Laid-Open Patent Publication No. 2012-181815, as shown in FIG. 28 thereof, the electroconductive area coverage of area A, which is connected between areas B, is 100%, whereas the electroconductive area coverage of the areas B is 79%. Therefore, on the whole, the areas A and B, which lie adjacent to each other, have different permeabilities. Thus, the electroconductive film may possibly be recognized visually as having a mottled pattern, for example.

According to the electroconductive film disclosed in Japanese Laid-Open Patent Publication No. 2012-119163, as shown in FIG. 21 thereof, only one or two randomly shaped areas, which make up a first connector that is connected between first basic grids, are disposed across the width of the first connector. Therefore, the electrical resistance of the first connector is likely to be high. As a result, similar to the electroconductive film disclosed in the aforementioned Japanese Laid-Open Patent Publication No. 2011-513846 (PCT), the time constant of the mesh bar increases, and thus a problem occurs in that the detection accuracy of the detection signal is reduced.

The present invention has been made in view of the aforementioned problems. It is an object of the present invention to provide an electroconductive film that offers the following advantages (a) through (c).

(a) Regardless of the fact that sizes of cells making up electrodes are not uniform, variations in resistance and electrostatic capacitance of the electrodes are small, and the surface resistance of a transparent electroconductive layer is reduced.

(b) Moire patterns can be reduced. Further, the permeabilities of narrow and wide portions of the electrodes essentially do not differ from each other, thereby preventing a striped pattern from being produced due to differences in permeability, while also improving visibility (making the metal thin lines unnoticeable).

(c) The burden on a driver IC, which is connected to the electroconductive film, can be reduced.

[1] An electroconductive film according to the present invention includes a transparent electroconductive layer having a plurality of electrodes extending along one direction, wherein electrode widths of the electrodes are irregular depending on locations thereof, and the electrodes are made up of a plurality of polygonal cells of metal thin lines, the cells are not uniform in size, the cells have an average size, which is equal to or greater than 1/30 and less than 1/3 of a smallest width of the electrodes, and the average size of the cells is uniform in the electrodes in their entirety.

If the average size of the cells is too small, the aperture ratio and permeability are lowered, resulting in reduced transparency and visibility, which leads to a problem in that at least the transparent electroconductive layer can easily be recognized by the human eye. Conversely, if the average size of the cells is too large, then although the aperture ratio and permeability are increased, the electrical resistance of the electrodes also is increased, resulting in a reduction in the accuracy with which the touched position can be detected.

Since the average size of the cells is uniform in the electrodes in their entirety, the permeability in the electrodes is not made uneven, and thus unevenness in permeability is unlikely to be visually recognized as a mottled pattern (irregularities). In other words, visibility is increased. Furthermore, since a plurality of cells whose cell sizes are not uniform are arranged evenly between plural electrodes, electrical unevenness is minimized. Therefore, in a case where the electroconductive film is applied to an electrostatic capacitance type of touch panel, variations in resistance and electrostatic capacitance between the electrodes are reduced. As a consequence, a driver IC, which is connected to the electroconductive film, does not require a circuit that carries out a processing operation for cancelling out variations in resistance and electrostatic capacitance. Consequently, the burden on the driver IC is reduced.

[2] In the present invention, the average size of the cells preferably is equal to or greater than 1/10 and less than 1/3 of the smallest width of the electrodes.

[3] In the present invention, the average size of the cells preferably is equal to or greater than 1/5 and less than 1/3 of the smallest width of the electrodes.

[4] In the present invention, the electrodes should preferably have a smallest width (minimum electrode width) in a range of 0.5-2.0 mm. If the minimum electrode width is too small, the electrical resistance of the transparent electroconductive layer tends to increase. In this case, the time constant, for example, of the transparent electroconductive layer increases, resulting in a reduction in the accuracy of detecting a position (touched position) that is in proximity to a finger or in contact with a finger. Conversely, if the minimum electrode width is too large, then assuming that an electroconductive film is applied to an electrostatic capacitance type of touch panel, for example, a change caused in the electrostatic capacitance by a human finger, which is brought into proximity or in contact with the touch panel, is relatively small, resulting in a reduction in detection accuracy. The minimum electrode width more preferably is in a range of 0.8-1.8 mm, and much more preferably, is in a range of 0.8-1.2 mm.

[5] In the present invention, the random ratio of sides of the cells preferably is in a range from 2% to 20%. If the random ratio is less than 2%, the sizes of the cells become essentially uniform, and the ability of the array of cells to reduce moire patterns is low. Conversely, if the random ratio is more than 20%, then different sized cells are uneven in the array, making visibility distinctively poor due to unevenness in permeability.

[6] In the present invention, the random ratio of sides of the cells preferably is in a range from 4% to 10%.

[7] In the present invention, a ratio of an average size of a plurality of cells making up a narrowest portion of the electrodes and an average size of a plurality of cells making up a portion of the electrodes except for the narrowest portion preferably is in a range of 0.9-1.1. If the ratio falls outside of this range, then differences in permeability are developed in the electrodes, which tend to be visually recognized as a mottled pattern (irregularities).

[8] In the present invention, if a maximum value of resistance values of a plurality of arbitrarily selected electrodes is represented by Rmax, a minimum value thereof is represented by Rmin, and an average value thereof is represented by Rave, then a resistance variation as represented by $$\{(Rmax-Rmin)/Rave\} \times 100$$

is less than 10%.

If the resistance variation is equal to or greater than 10%, then an integrated circuit (IC) for energizing the touch panel needs to have a circuit for carrying out a processing operation for cancelling out the resistance variation. Consequently, the burden on the IC tends to become unduly large.

[9] In the present invention, if a maximum value of resistance values of a plurality of arbitrarily electrodes is represented by Rmax, a minimum value thereof is represented by Rmin, and an average value thereof is represented by Rave, then a resistance variation as represented by $$\{(Rmax-Rmin)/Rave\} \times 100$$

is less than 5%.

[10] In features [8] or [9] above, the electrodes that are selected arbitrarily may comprise three electrodes successively arranged in one direction. In this case, it is possible to assess whether the level of a detection signal from the same transparent electroconductive layer changes linearly or non-linearly depending on the touched position. If the resistance variation falls within the preferable range described above, the level of the detection signal changes linearly depending on the touched position. Consequently, the detection accuracy of the driver IC increases.

[11] In the present invention, among the cells that make up the transparent electroconductive layer, cells which are connected to connectors that connect with interconnecting members preferably have sizes identical to each other.

[12] In the present invention, a length of a side of each of the cells may be in a range from 100 μm to 800 μm. A length within this range makes it easy to keep the average size of the cells equal to or greater than 1/30 and less than 1/3 of the smallest width of the electrodes.

[13] In the present invention, the metal thin lines may have a line width in a range from 0.1 μm to 15 μm. If the line width is less than the above-described lower limit value, then since electroconductivity is insufficient, the electroconductive film, in a state of being incorporated in a touch panel, exhibits insufficient detection sensitivity. If the line width exceeds the above-described upper limit value, then a moire pattern caused by the metal thin lines becomes distinctive, or the visibility of the electroconductive film, in a state of being incorporated in a touch panel, becomes poor.

The electroconductive film according to the present invention offers the following advantages.

(1) Regardless of the fact that sizes of the cells making up the electrodes are not uniform, variations in resistance and electrostatic capacitance of the electrodes are small, and the surface resistance of the transparent electroconductive layer is reduced.

(2) Moire patterns can be reduced. Further, the differences between the permeabilities of narrow and wide portions of the electrodes are reduced, thereby preventing a striped pattern from being produced due to differences in permeability, while also improving visibility (making the metal thin lines unnoticeable).

(3) The burden on the driver IC, which is connected to the electroconductive film, can be reduced.

The above objects, features, and advantages will be easily understood from the following description of the embodiments when taken in conjunction with the accompanying drawings.

BRIEF DESCRIPTION OF DRAWINGS

FIGS. 5A through 5C are plan views showing modifications of the pattern of the transparent electroconductive layer;

FIG. 12A is a plan view showing by way of example a pattern of a transparent electroconductive layer, and in particular a portion of an electrode, of an electroconductive film according to Comparative Example 3; and FIG. 12B is a plan view showing by way of example a pattern of a transparent electroconductive layer of an electroconductive film according to Comparative Example 4.

DESCRIPTION OF EMBODIMENTS

A display device incorporating an electroconductive film according to the present invention together with electroconductive films according to various embodiments will be described below with reference to FIGS. 1 through 12B. The symbol "-" which is used to represent numerical ranges in the following description shall be interpreted as including numerical values that represent upper and lower limits of the numerical ranges.

Figure 1:
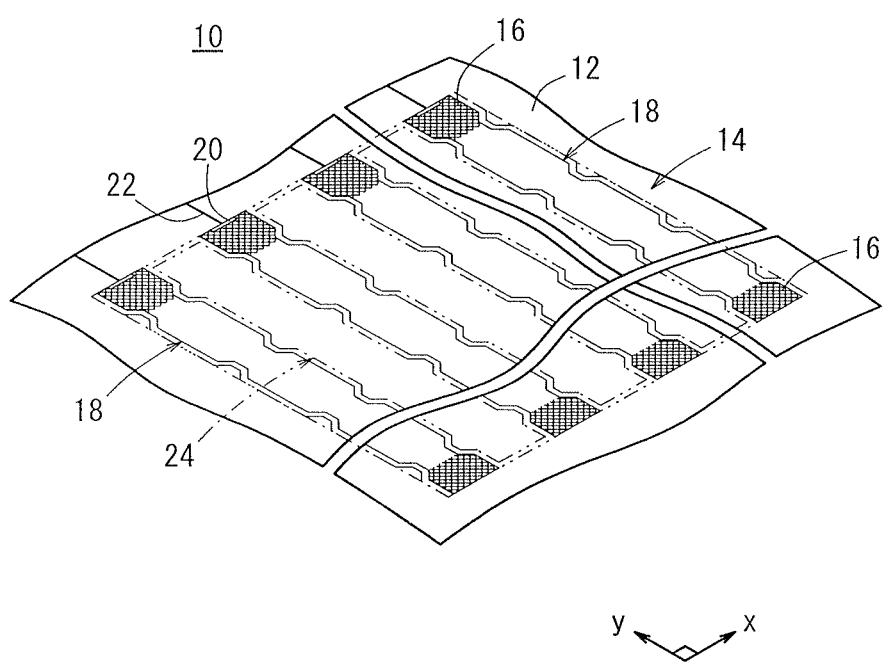
FIG. 1 is a plan view showing by way of example an electroconductive film according to an embodiment of the present invention.
Figure 2:
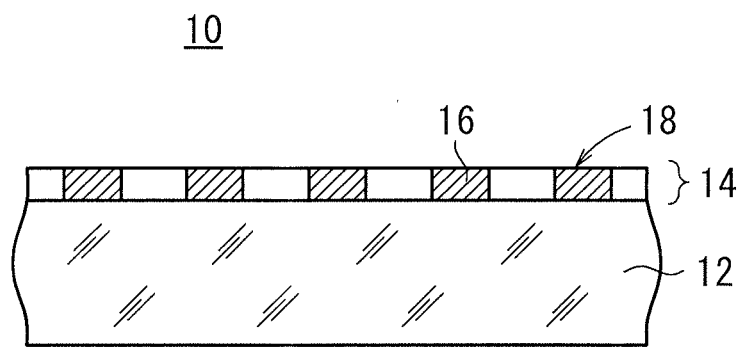
FIG. 2 is a cross-sectional view, partially omitted from illustration, showing the electroconductive film.

As shown in FIG. 1, an electroconductive film according to an embodiment of the present invention includes an electroconductive portion 14 disposed on a surface of a transparent base 12 (see FIG. 2). The electroconductive portion 14 has two or more transparent electroconductive layers 18 made up of metal thin lines 16, and a terminal interconnecting pattern 22, which is electrically connected to the ends of the transparent electroconductive layers 18 through pads 20 (connectors). Although the transparent electroconductive layers 18 are illustrated as being defined by profile lines (solid lines), such profile lines do not actually exist. Although not shown in detail, transparent dummy layers 24 (indicated by the two-dot-dash lines), which are electrically insulated from the transparent electroconductive layers 18, are disposed between the transparent electroconductive layers 18 on the surface of the transparent base 12. The transparent dummy layers 24 are made up of metal thin lines 16 in the same manner as the transparent electroconductive layers 18. The transparent dummy layers 24 serve as camouflage layers for making the transparent electroconductive layers 18 difficult to be recognized visually. However, the transparent dummy layers 24 are not used as electrodes, and may be dispensed with.

Figures 3A, 3B:
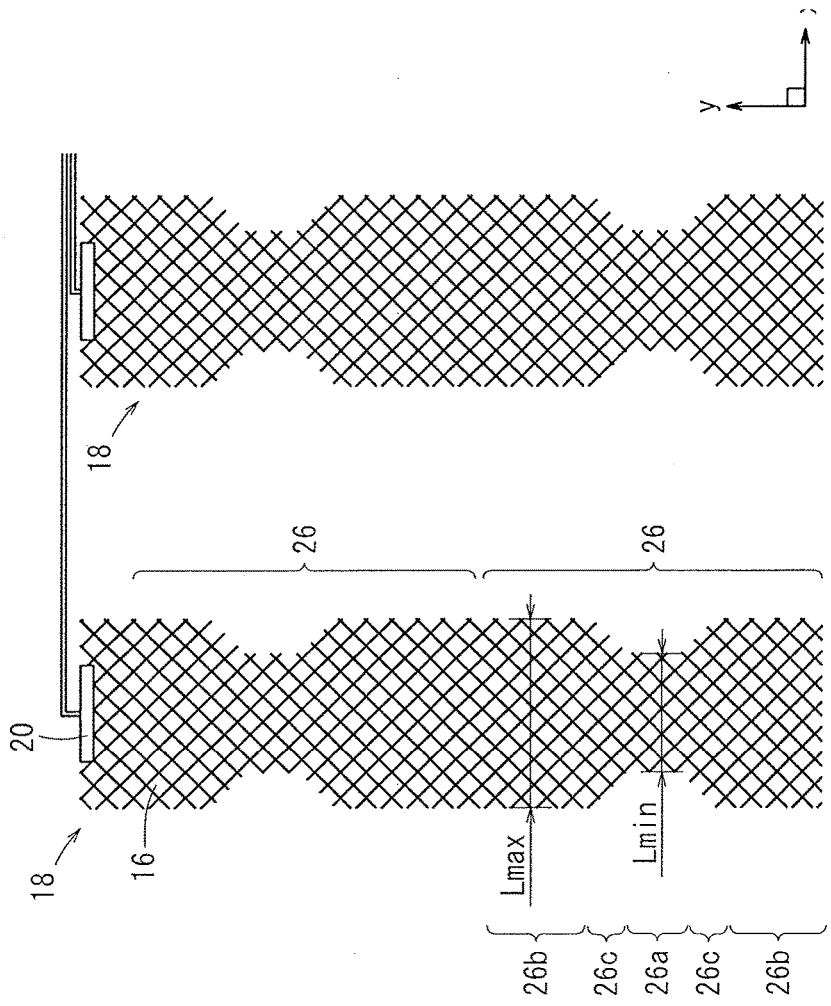
FIG. 3A is a plan view showing by way of example a pattern of a transparent electroconductive layer.
FIG. 3B is a plan view showing a cell by way of example.
Figure 4B:
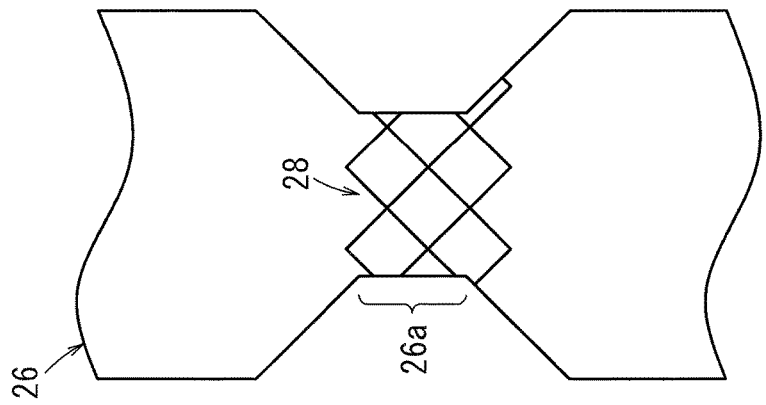
FIG. 4B is a view showing by way of example an array of cells having a large cell size in another electrode.
Figure 4A:
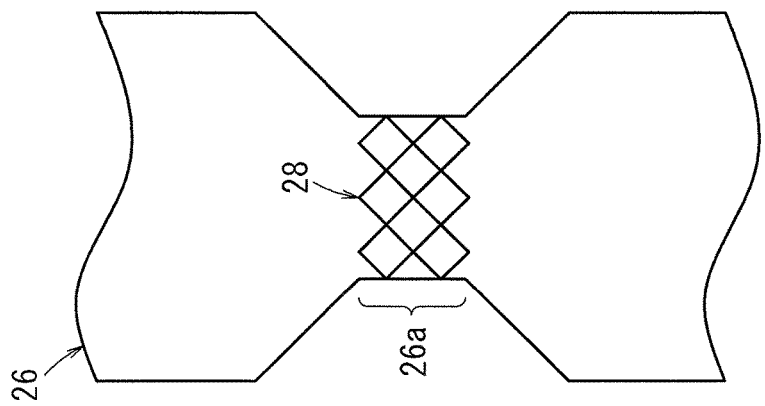
FIG. 4A is a view showing by way of example an array of cells having a small cell size in an electrode.

As shown in FIG. 3A, for example, each of the transparent electroconductive layers 18 extends in one direction (y direction) and is of a shape such that plural electrodes 26 are arrayed in one direction (y direction). The electrodes 26 have electrode widths, which are not equal depending on their positions, and each of the electrodes 26 is made up of a plurality of polygonal cells 28 (see FIGS. 1 and 3B) of metal thin lines 16. In FIG. 1, the cells 28 are partially omitted from illustration. Although the transparent electroconductive layers 18 are illustrated as being defined by profile lines (solid lines) in FIG. 1, such profile lines do not actually exist. The transparent dummy layers 24 are omitted from illustration.

If the electroconductive film 10 is used as an electroconductive film for a touch panel, the metal thin lines 16 of the transparent electroconductive layers 18 preferably have a line width in a range from 0.1 µm to 15 µm. More preferably, the line width is in a range from 1 µm to 9 µm, and much more preferably, is in a range from 2 µm to 7 µm. The surface resistance of the transparent electroconductive layers 18 preferably is in a range of 0.1-100 ohms/sq. The lower limit value of the surface resistance preferably is equal to or greater than 1 ohm/sq., 3 ohms/sq., 5 ohms/sq., or 10 ohms/sq. The upper limit value of the surface resistance preferably is equal to or less than 70 ohms/sq. or 50 ohms/sq.

As shown in FIG. 3B, the cells 28 have non-uniform sizes (cell sizes Ls). The cells 28 have an average cell size Lsave (not shown), which is equal to or greater than 1/30 and less than 1/3 of the smallest width Lmin of the electrodes 26. In the electrodes 26 as a whole, the average cell sizes Lsave of the cells 28 are uniform. More specifically, each of the transparent electroconductive layers 18 extends as a strip-like layer in the y direction, and includes narrowest portions 26a that appear at constant intervals. Each of the electrodes 26 is represented by a region extending from the center of a widest portion 26b to the center of another widest portion 26b, with a narrowest portion 26a being interposed therebetween. In other words, each of the transparent electroconductive layers 18 is made up of a plurality of electrodes 26 connected (series-connected) in the y direction. Each of the transparent electroconductive layers 18 has a portion 26c whose width gradually becomes smaller from the widest portion 26b toward the narrowest portion 26a. In the following description, the width of the widest portion 26b of each of the electrodes 26 will be referred to as a maximum electrode width Lmax, and the width of the narrowest portion 26a of each of the electrodes 26 will be referred to as a minimum electrode width Lmin.

If the electroconductive film 10 is used as an electroconductive film for a touch panel, then the size of a human finger, particularly the width (generally 3-7 mm) of a portion thereof, which is in proximity to or in contact with the touch panel, may be selected as the maximum electrode width Lmax. A value, which is in a range of 0.5-6.0 mm, preferably, is in a range of 0.8-3.0 mm, and more preferably, is in a range of 0.8-1.2 mm, may be selected as the minimum electrode width Lmin. If the minimum electrode width Lmin is too small, the electrical resistance of the transparent electroconductive layers 18 tends to increase. In this case, the time constant, for example, of the transparent electroconductive layers 18 increases, resulting in a reduction in the accuracy with which a position (touched position) that is in proximity to or in contact with a finger can be detected. Conversely, if the minimum electrode width Lmin is too large, then assuming that the electroconductive film 10 is applied to an electrostatic capacitance type of touch panel, a change caused in the electrostatic capacitance by a human finger that is brought into proximity or in contact with the touch panel is relatively small, thus resulting in a reduction in detection accuracy.

Each of the cells 28 is of a polygonal shape, which may be a triangular shape, a quadrangular shape (square, rectangle, parallelogram, rhomboid, or the like), a pentagonal shape, a hexagonal shape, or the like. Sides of the polygonal shape may partially be curved. If a length of each cell 28 along a direction perpendicular to the y direction (direction along which the minimum electrode width Lmin is defined: x direction) is defined as a cell size Ls, then the average cell size Lsave preferably is equal to or greater than 1/30 and less than 1/3 of the smallest electrode width Lmin. More preferably, the average cell size Lsave is equal to or greater than 1/10 and less than 1/3, and much more preferably, is equal to or greater than 1/5 and less than 1/3. If the average cell size Lsave is too small, then the aperture ratio and permeability are lowered, resulting in reduced transparency. Conversely, if the average cell size Lsave of the cells 28 is too large, then although the aperture ratio and permeability are increased, the electrical resistance of the electrodes 26 also is increased, resulting in a reduction in the accuracy with which the touched position can be detected. Furthermore, since the number of cells that make up the narrowest portion 26a varies significantly depending on the position, the resistance of each of the transparent electroconductive layers 18 also varies significantly. Consequently, an IC (driver IC) for energizing the touch panel needs to have a circuit that carries out a processing operation for cancelling out variations in resistance and electrostatic capacitance, with the result that the burden on the driver IC tends to become unduly large.

The length Ld of a side of each of the cells 28 preferably is in a range from 100 µm to 800 µm, depending on the average cell size Lsave with respect to the minimum electrode width Lmin. The length Ld preferably is in a range from 100 µm to 400 µm, more preferably, is in a range from 150 µm to 300 µm, and most preferably, is in a range from 210 µm to 250 µm. The length Ld, which is defined in the foregoing manner, makes it easy to maintain the average cell size Lsave equal to or greater than 1/30 and less than 1/3 of the smallest electrode width Lmin.

The random ratio of the sides of the cells 28 whose cell sizes Ls are not uniform preferably is in a range from 2% to 20%, more preferably, is in a range from 4% to 10%, and much more preferably, is in a range from 6% to 8%. The random ratio refers to a larger one of the values determined according to the following equations (1) and (2), where Ldmax represents a maximum value of the lengths Ld of sides of thirty successive cells 28, Ldmin represents a minimum value of the lengths Ld, and Ldave represents an average value of the lengths Ld.

$$(Ld\text{max}-Ld\text{ave})/Ld\text{ave}\times 100 \quad (1)$$

$$(Ld\text{ave}-Ld\text{min})/Ld\text{ave}\times 100 \quad (2)$$

If the random ratio is less than 2%, the cell sizes Ls of the cells 28 are essentially uniform, and the ability of the array of cells 28 to reduce moire patterns is low. Conversely, if the random ratio is greater than 20%, the unevenness of the cell sizes becomes irregular, leading to poor visibility. For example, as indicated by the patterns of the narrowest portions 26a shown in FIGS. 4A and 4B, cells 28 having a smaller cell size are arrayed (FIG. 4A) in an electrode 26, whereas cells 28 having a larger cell size are arrayed (FIG. 4B) in another electrode 26.

According to the present embodiment, the average cell sizes Lsave of a plurality of cells 28 making up the electrode 26 as a whole are uniform. More specifically, as shown in FIG. 3A, the ratio of the average cell size Lsave of a plurality of cells 28 that make up a region from the widest portion 26b to the gradually narrower portion 26c of the electrode 26, and the average cell size Lsave of a plurality of cells 28 that make up the narrowest portion 26a is in a range of 0.9-1.1. If the ratio falls outside of this range, the electrode 26 tends to exhibit different permeabilities, which are recognized visually as a mottled pattern (irregularity).

According to the present embodiment, furthermore, a plurality of cells 28 whose cell sizes Ls are not uniform have a good variance (randomness). More specifically, as shown in FIG. 10A, the resistance variation of each of the resistances (resistance 1 through resistance 3) of three arbitrarily selected electrodes (electrode 1 through electrode 3) preferably is less than 10%, and more preferably, is equal to or less than 5%.

The variation in resistance can be determined according to the following equation, where Rmax represents the maximum one of the resistance values from among a plurality of arbitrarily selected electrodes, Rmin represents the minimum one of the resistance values, and Rave represents the average of the resistance values.

$$\text{Resistance variation (\%)} = \{(R\text{max} - R\text{min})/R\text{ave}\} \times 100$$

Figure 10A:
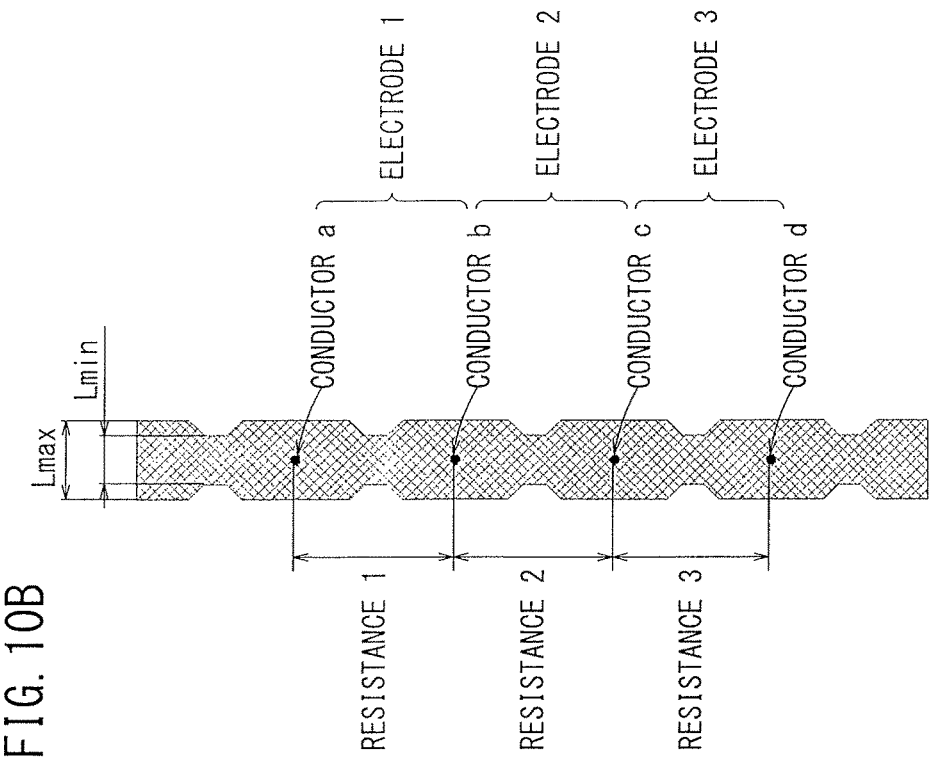
FIG. 10A is a plan view showing by way of example a pattern of a transparent electroconductive layer of an electroconductive film according to Inventive Example 1.

FIG. 10A shows a case in which three electrodes, which are arranged successively in one direction, are selected from one transparent electroconductive layer 18.

Accordingly, it is possible to assess whether the level of a detection signal from the same transparent electroconductive layer 18 changes linearly or nonlinearly depending on the touched position. If the resistance variation falls within the preferable range described above, then the level of the detection signal changes linearly depending on the touched position, with the result that the detection accuracy of the driver IC increases. Electrodes 26 may be selected from different transparent electroconductive layers 18.

According to the present embodiment, furthermore, among a plurality of cells 28 that make up a transparent electroconductive layer 18, cells 28 thereof that are connected to a pad 20 (connector) have the same cell sizes Ls.

In the above example, the profile shape of a transparent electroconductive layer 18 includes a portion 26c that becomes gradually narrower from a widest portion 26b toward a narrowest portion 26a. According to another example, as shown in FIG. 5A, the width may change stepwise from a widest portion 26b toward a narrowest portion 26a. Alternatively, as shown in FIG. 5B, the length Lb (length along the direction in which a transparent electroconductive layer 18 extends) of a widest portion 26b and the length La of a narrowest portion 26a may be equivalent to each other. Further, alternatively, as shown in FIG. 5C, a polygonal (e.g., rhomboid) light-permeable portion 30 may be provided centrally in a widest portion 26b.

Figure 6C:
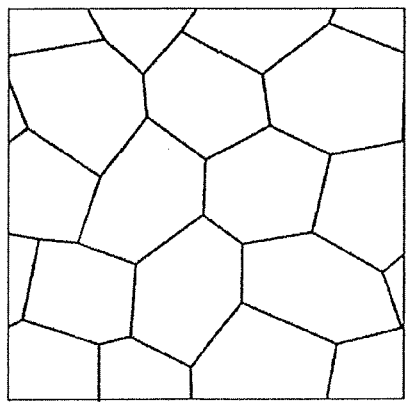
FIGS. 6A through 6C are plan views showing modifications of the shapes of cells having non-uniform cell sizes.
Figure 6B:
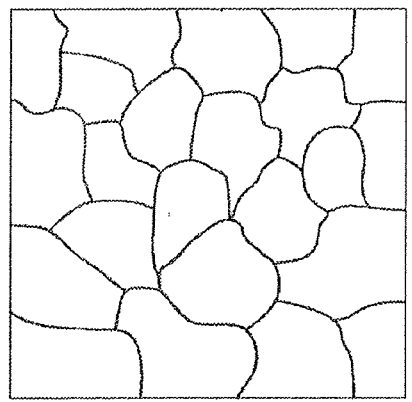
Figure 6A:
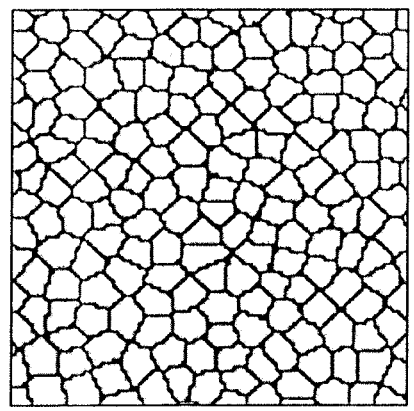

Other than the square shape described above, the cells 28 whose cell sizes Ls are not uniform may be of hexagonal shapes with sides that vary randomly, as shown in FIG. 6A. As shown in FIG. 6B, the cells 28 may be of curved shapes including curved portions with shapes and lengths that vary randomly. As shown in FIG. 6C, the cells 28 may be of randomly arranged quadrangular and pentagonal shapes having different sizes.

A touch panel 100 in which the above electroconductive film 10 is incorporated will be described below with reference to FIGS. 7 through 9B.

Figure 7:
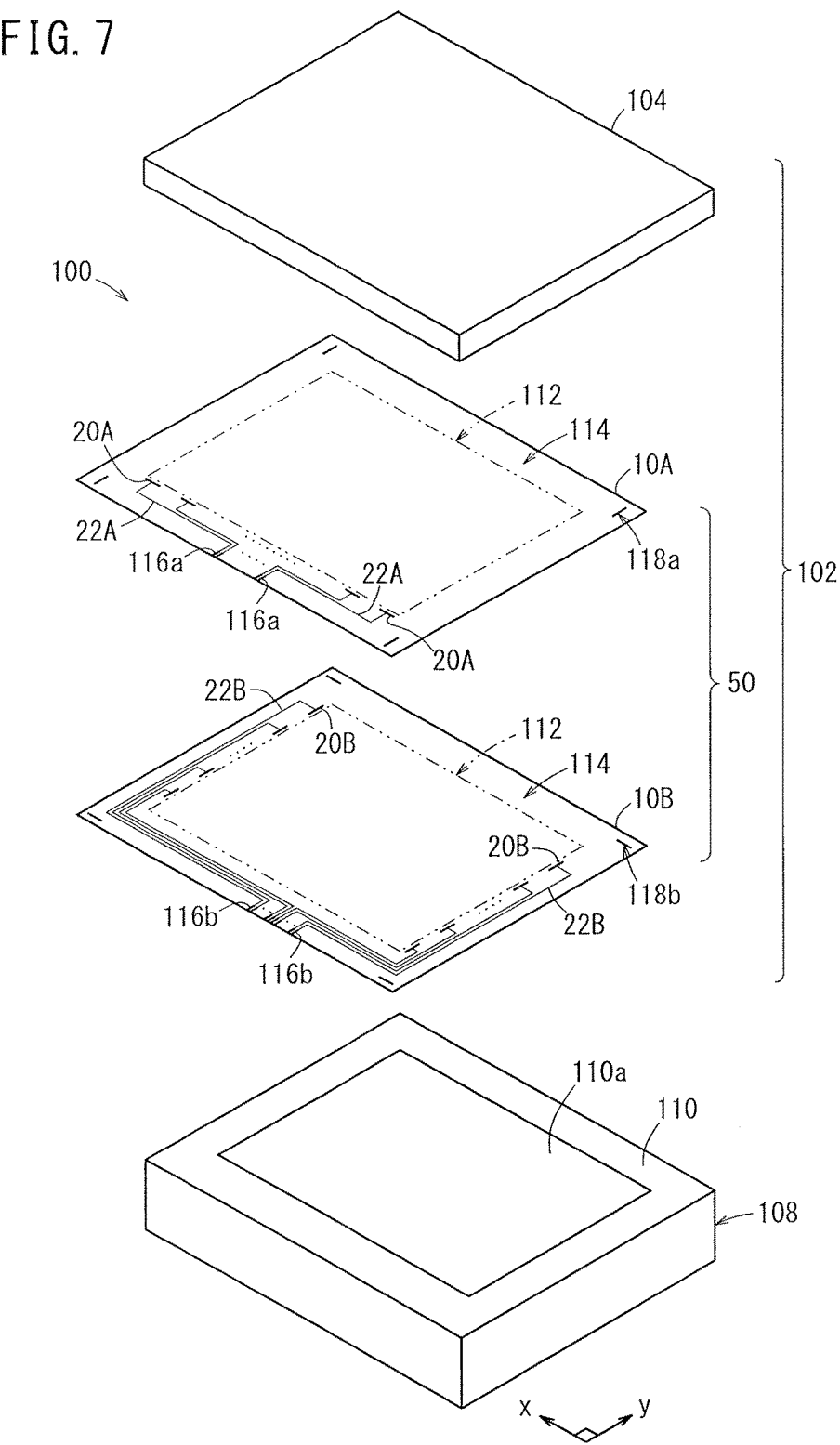
FIG. 7 is an exploded perspective view showing the structure of a touch panel having a stacked electroconductive film assembly made up of electroconductive films.
Figure 8:
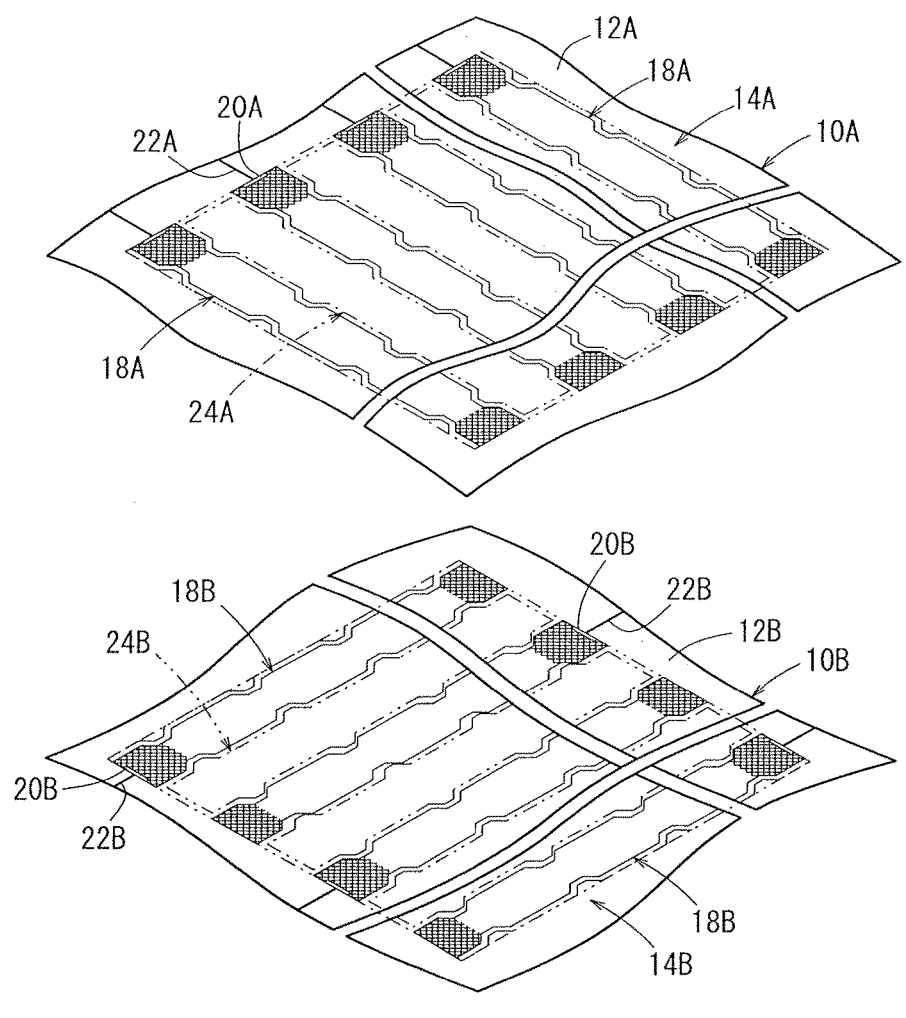
FIG. 8 is an exploded perspective view, partially omitted from illustration, showing the stacked electroconductive film assembly.
Figure 9A:
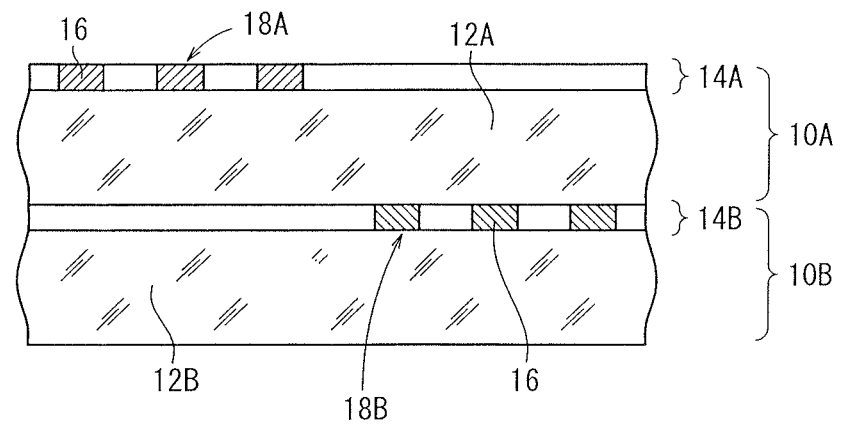
FIG. 9A is a cross-sectional view, partially omitted from illustration, showing by way of example a stacked electroconductive film assembly.

The touch panel 100 includes a sensor body 102 and a non-illustrated control circuit (including a driver IC, etc.). As shown in FIGS. 7, 8, and 9A, the sensor body 102 includes a stacked electroconductive film assembly 50 made up of a first electroconductive film 10A and a second electroconductive film 10B, which are stacked together, and each of which comprises the above electroconductive film 10, and a protective layer 104 stacked on the stacked electroconductive film assembly 50. In FIG. 9A, the protective layer 104 is omitted from illustration. The stacked electroconductive film assembly 50 and the protective layer 104 are disposed on a display panel 110 of a display device 108 such as a liquid crystal display or the like, for example. As viewed in plan, the sensor body 102 has a sensor area 112 disposed in a region corresponding to a display screen 110a of the display panel 110, and a terminal interconnecting area 114 (a so-called frame) disposed in a region corresponding to an outer peripheral portion of the display panel 110.

As shown in FIGS. 7, 8, and 9A, the first electroconductive film 10A, which is applied to the touch panel 100, has a first electroconductive portion 14A disposed on a principal surface of a first transparent base 12A. Since the first electroconductive portion 14A is essentially identical in structure to the electroconductive portion 14 of the electroconductive film 10 described above, redundant descriptions thereof will be omitted. However, the first electroconductive portion 14A includes a plurality of first transparent electroconductive layers 18A that extend in the y direction. Although the first transparent electroconductive layers 18A are illustrated as being defined by profile lines (solid lines), such profile lines do not actually exist. Although not shown in detail, first transparent dummy layers 24A (indicated by the two-dot-dash lines), which are electrically insulated from the first transparent electroconductive layers 18A, are disposed between the first transparent electroconductive layers 18A on the surface of the first transparent base 12A. However, the first transparent dummy layers 24A may be dispensed with.

As shown in FIG. 8, the first electroconductive film 10A has the first transparent electroconductive layers 18A arrayed in a portion thereof that corresponds to the sensor area 112. In the terminal interconnecting area 114, the first electroconductive film 10A has a plurality of first terminal interconnecting patterns 22A made up of metal thin lines that extend from respective first pads 20A.

In the example shown in FIG. 7, the first electroconductive film 10A has a contour, which is of a rectangular shape as viewed in plan, and the sensor area 112 also has a contour, which is of a rectangular shape. Plural first terminals 116a are disposed in a longitudinal central area of a peripheral edge portion of the terminal interconnecting area 114 on a longer side of the first electroconductive film 10A, such that the first terminals 116a are arrayed longitudinally on the longer side of the first electroconductive film 10A. A plurality of first pads 20A are arrayed linearly along a longer side of the sensor area 112 (i.e., a longer side that is closest to the longer side of the first electroconductive film 10A: x direction). The first terminal interconnecting patterns 22A, which extend from the respective first pads 20A, are directed toward a substantially central area of the longer side of the first electroconductive film 10A, and are connected electrically to corresponding first terminals 116a. Therefore, the first terminal interconnecting patterns 22A, which are connected to corresponding first pads 20A on both sides of the longer side of the sensor area 112, are of substantially the same length. The first terminals 116a may be disposed in corners or in nearby regions of the first electroconductive film 10A. However, if the first terminals 116a are disposed in this manner in corners or in nearby regions, the longest ones of the first terminal interconnecting patterns 22A and the shortest one of the first terminal interconnecting patterns 22A have significant differences in length. As a result, a problem arises in that transferring of signals from the longest first terminal interconnecting patterns 22A and a plurality of first terminal interconnecting patterns 22A in the vicinity thereof to the first electroconductive film 10A is slowed down. According to the present embodiment, inasmuch as the first terminals 116a are disposed in a longitudinal central area of the longer side of the first electroconductive film 10A, transferring of signals can be prevented from suffering from local delays, which leads to an increase in the response time.

As shown in FIGS. 7, 8, and 9A, the second electroconductive film 10B has a second electroconductive portion 14B disposed on a principal surface of a second transparent base 12B. Since the second electroconductive portion 14B also is essentially identical in structure to the electroconductive portion 14 of the electroconductive film 10 described above, redundant descriptions thereof will be omitted. However, the second electroconductive portion 14B includes a plurality of second transparent electroconductive layers 18B that extend in the x direction. In FIG. 8, the cells 28 are partially omitted from illustration. Although the second transparent electroconductive layers 18B are illustrated as being defined by profile lines (solid lines), such profile lines do not actually exist. Although not shown in detail, second transparent dummy layers 24B (indicated by the two-dot-dash lines), which are electrically insulated from the second transparent electroconductive layers 18B, are disposed between the second transparent electroconductive layers 18B on the surface of the second transparent base 12B. However, the second transparent dummy layers 24B may be dispensed with.

Ends of every other (e.g., odd-numbered) second transparent electroconductive layers 18B and other ends of the even-numbered second transparent electroconductive layers 18B are connected electrically, by respective second pads 20B, to second terminal interconnecting patterns 22B made of metal thin lines. The second transparent electroconductive layers 18B are arrayed in a portion, which corresponds to the sensor area 112. The second terminal interconnecting patterns 22B, which extend from the respective second pads 20B, are arrayed in the terminal interconnecting area 114.

As shown in FIG. 7, plural second terminals 116b are disposed in a longitudinal central area of a peripheral edge portion of the terminal interconnecting area 114 on a longer side of the second electroconductive film 10B, such that the second terminals 116b are arrayed longitudinally on the longer side of the second electroconductive film 10B. Plural second pads 20B (e.g., odd-numbered second pads 20B) are linearly arrayed along a shorter side of the sensor area 112 (i.e., a shorter side that is closest to the shorter side of the second electroconductive film 10B: y direction). A plurality of second pads 20B (e.g., even-numbered second pads 20B) are linearly arrayed along the other shorter side of the sensor area 112 (i.e., a shorter side that is closest to the other shorter side of the second electroconductive film 10B: y direction).

Among the plurality of second transparent electroconductive layers 18B, the odd-numbered second transparent electroconductive layers 18B, for example, are connected to corresponding odd-numbered second pads 20B, whereas the even-numbered second transparent electroconductive layers 18B are connected to corresponding even-numbered second pads 20B. The second terminal interconnecting patterns 22B, which extend from the respective odd-numbered and even-numbered second pads 20B, are directed toward a substantially central area of the longer side of the second electroconductive film 10B, and are electrically connected to corresponding second terminals 116b. Therefore, the first and second terminal interconnecting patterns 22B, for example, are of substantially the same length. Similarly, the (2n−1)th and the 2nth second terminal interconnecting patterns 22B are of substantially the same length (n=1, 2, 3, . . . ).

The second terminals 116b may be disposed in corners or in nearby regions of the second electroconductive film 10B. However, as described above, if the second terminals 116b are disposed in this manner in corners or in nearby regions, a problem arises in that transferring of signals from the longest second terminal interconnecting patterns 22B and a plurality of second terminal interconnecting patterns 22B in the vicinity thereof to the second electroconductive film 10B is slowed down. According to the present embodiment, inasmuch as the second terminals 116b are disposed in a longitudinal central area of the longer side of the second electroconductive film 10B, transferring of signals can be prevented from suffering from local delays, which leads to an increase in the response time.

The first terminal interconnecting patterns 22A may extend in the same manner as the second terminal interconnecting patterns 22B, and the second terminal interconnecting patterns 22B may extend in the same manner as the first terminal interconnecting patterns 22A.

For stacking the first electroconductive film 10A and the second electroconductive film 10B together to form the stacked electroconductive film assembly 50, the first electroconductive film 10A, for example, is positioned such that the first transparent electroconductive layers 18A extend in the y direction, and the second electroconductive film 10B is positioned such that the second transparent electroconductive layers 18B extend in the x direction. Thereafter, the first electroconductive film 10A and the second electroconductive film 10B are stacked in such a manner that the narrowest portions 26a of the first transparent electroconductive layers 18A and the narrowest portions 26a of the second transparent electroconductive layers 18B confront one another.

The second transparent electroconductive layers 18B of the second electroconductive film 10B may be similar in shape to the first transparent electroconductive layers 18A. However, alternatively, the second transparent electroconductive layers 18B may be of a strip-like pattern having a constant electrode width. In this case, the electrode width may be the same as the minimum electrode width Lmin or the maximum electrode width Lmax of the first transparent electroconductive layers 18A.

If the stacked electroconductive film assembly 50 is used as a touch panel, the protective layer 104 is disposed on the first electroconductive film 10A. The first terminal interconnecting patterns 22A, which extend from the first electroconductive film 10A, and the second terminal interconnecting patterns 22B, which extend from the second transparent electroconductive layers 18B, are connected to the driver IC that controls a scanning process, for example.

A touched position may be detected by a self-capacitance process or by a mutual-capacitance process. More specifically, according to the self-capacitance process, voltage signals for detecting the touched position are supplied successively to the first electroconductive film 10A, and voltage signals for detecting the touched position are supplied successively to the second electroconductive film 10B. In a case where a fingertip is brought into contact with or into the vicinity of the upper surface of the protective layer 104, the capacitance between the first transparent electroconductive layer 18A and the second transparent electroconductive layer 18B, which confront the touched position, and GND (ground) increases. At this time, the waveforms of signals transmitted from the first transparent electroconductive layer 18A and the second transparent electroconductive layer 18B become different from the waveforms of signals transmitted from the other transparent electroconductive layers. Therefore, the driver IC calculates the touched position on the basis of the signals that are transmitted from the first transparent electroconductive layer 18A and the second transparent electroconductive layer 18B.

According to the mutual capacitance process, voltage signals for detecting a touched position are supplied successively to the first transparent electroconductive layers 18A, for example, and a sensing process (for detecting a transmitted signal) is performed successively on the second transparent electroconductive layers 18B. In a case where a fingertip is brought into contact with or into the vicinity of the upper surface of the protective layer 104, a stray capacitance from the finger is added in parallel with the parasitic capacitance formed between the first transparent electroconductive layer 18A and the second transparent electroconductive layer 18B, which confront the touched position. At this time, the waveforms of signals transmitted from the second transparent electroconductive layer 18B become different from the waveforms of signals transmitted from the other second transparent electroconductive layers 18B. The driver IC calculates the touched position on the basis of the sequence of the first transparent electroconductive layers 18A, to which the voltage signals are supplied, and the supplied signal, which is transmitted from the second transparent electroconductive layer 18B.

The self capacitance process or the mutual capacitance process, which is employed in the foregoing manner as a process for detecting a touched position, is capable of detecting touched positions in a case where two fingertips are simultaneously brought into contact with or into the vicinity of the upper surface of the protective layer 104. Background art documents concerning detection circuits of a projection-type electrostatic capacitance type include U.S. Pat. No. 4,582,955, U.S. Pat. No. 4,686,332, U.S. Pat. No. 4,733,222, U.S. Pat. No. 5,374,787, U.S. Pat. No. 5,543,588, U.S. Pat. No. 7,030,860, and U.S. Patent Application Publication No. 2004/0155871.

Figure 9B:
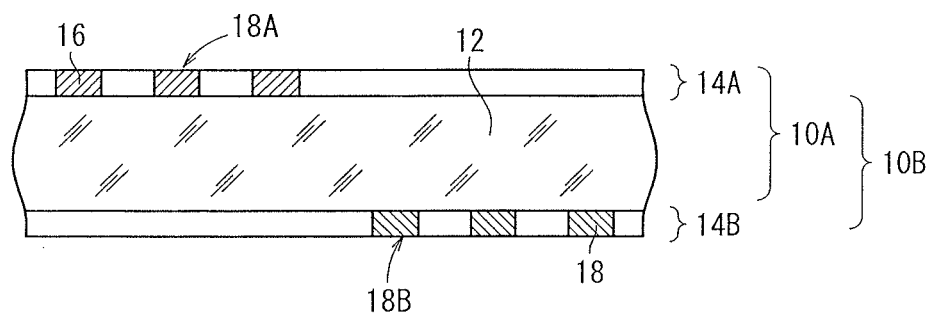
FIG. 9B is a cross-sectional view, partially omitted from illustration, showing by way of example another stacked electroconductive film assembly.

As shown in FIGS. 8 and 9A, the stacked electroconductive film assembly 50 includes the first electroconductive portion 14A, which is disposed on a principal surface of the first transparent base 12A, and the second electroconductive portion 14B, which is disposed on a principal surface of the second transparent base 12B. According to another example, as shown in FIG. 9B, the first electroconductive portion 14A may be disposed on one principal surface of the transparent base 12, and the second electroconductive portion 14B may be disposed on another principal surface of the transparent base 12. In this case, the second transparent base 12B is not provided. Further, the transparent base 12 is stacked on the second electroconductive portion 14B, and the first electroconductive portion 14A is stacked on the transparent base 12. Another layer may be interposed between the first electroconductive film 10A and the second electroconductive film 10B. In addition, provided they are insulated from each other, the first electroconductive portion 14A and the second electroconductive portion 14B may be disposed in confronting relation to each other.

As shown in FIG. 7, first alignment marks 118*a* and second alignment marks 118*b* for positioning the first electroconductive film 10A and the second electroconductive film 10B in a case where the first electroconductive film 10A and the second electroconductive film 10B are bonded to each other preferably is disposed on respective corners, for example, of the first electroconductive film 10A and the second electroconductive film 10B. The first alignment marks 118*a* and the second alignment marks 118*b* serve as new composite alignment marks after the first electroconductive film 10A and the second electroconductive film 10B have been bonded to form the stacked electroconductive film assembly 50. The composite alignment marks also function as alignment marks for positioning the stacked electroconductive film assembly 50 in a case where the stacked electroconductive film assembly 50 is placed on the display panel 110.

In the above example, the first electroconductive film 10A and the second electroconductive film 10B are applied to the projection-type electrostatic capacitance type touch panel 100. However, the first electroconductive film 10A and the second electroconductive film 10B may be applied to a surface-type electrostatic capacitance type touch panel or a resistance film type touch panel.

In addition to an electroconductive film for the touch panel of the display device 108, the electroconductive film 10 according to the present embodiment may be used as an electromagnetic wave shield film for the display device 108, or an optical film that is disposed on the display panel 110 of the display device 108. The display device 108 may be a liquid crystal display, a plasma display, an organic EL display, an inorganic EL display, or the like.

Methods of manufacturing the electroconductive film 10 will be described below. According to a first method for manufacturing the electroconductive film 10, a photosensitive material having an emulsion layer containing a photosensitive silver halide as a transparent base 12, for example, is exposed to light and developed. Exposed areas and unexposed areas are converted into metal silver areas and light-permeable areas, respectively, thereby producing an electroconductive portion 14. Furthermore, additionally, the metal silver areas may be subjected to at least one of physical development and plating, so that an electroconductive metal is carried on or within the metal silver areas.

According to a second method, a photosensitive plated layer is formed on the transparent base 12 using a plating pretreatment material, after which the photosensitive plated layer is exposed to light, developed, and plated. Exposed areas and unexposed areas are made into metal silver areas and light-permeable areas, respectively, thereby producing an electroconductive portion 14. In addition, the metal silver areas may be subjected to at least one of physical development and plating, so that an electroconductive metal is carried in the metal silver areas.

Preferred forms of the method using the plating pretreatment material (second method) include the following two forms (a) and (b). Specific details of the forms described below are disclosed in Japanese Laid-Open Patent Publication No. 2003-213437, Japanese Laid-Open Patent Publication No. 2006-064923, Japanese Laid-Open Patent Publication No. 2006-058797, and Japanese Laid-Open Patent Publication No. 2006-135271, etc.

(a) A transparent base 12 is coated with a plated layer containing a plating catalyst or a functional group that will interact with a precursor of the plating catalyst. Thereafter, the plated layer is exposed to light, developed, and plated to form a metal portion on the plated material.

(b) A foundation layer containing a polymer and a metal oxide, and a plated layer containing a plating catalyst or a functional group that will interact with a precursor of the plating catalyst are deposited in this order on a transparent base 12. Thereafter, the plated layer is exposed to light, developed, and plated to form a metal portion on the plated material.

According to a third method, a photoresist film, which is disposed on a metal foil on a transparent base 12, is exposed to light and developed into a resist pattern. Then, a copper foil, which is exposed from the resist pattern, is etched into an electroconductive portion 14.

According to a fourth method, a paste containing fine metal particles is printed on a transparent base 12. Thereafter, the paste is plated with a metal, thereby forming a mesh pattern.

According to a fifth method, a mesh pattern is printed on a transparent base 12 using a screen printing plate or a gravure printing plate.

According to a sixth method, an electroconductive portion 14 is formed on a transparent base 12 by an ink jet.

The method that uses a silver halide photographic photosensitive material in order to manufacture the electroconductive film 10 according to the present embodiment will primarily be described below as a particularly preferred aspect of the invention.

The method of manufacturing the electroconductive film 10 according to the present embodiment includes the following three forms, in relation to the photosensitive materials and developing processes used therein.

(1) A photosensitive silver halide black-and-white photosensitive material, which does not contain physical development nuclei, is chemically developed or thermally developed in order to form a metal silver portion on the photosensitive material.

(2) A photosensitive silver halide black-and-white photosensitive material, which contains physical development nuclei in a silver halide emulsion layer, is physically developed by way of dissolution in order to form a metal silver portion on the photosensitive material.

(3) A photosensitive silver halide black-and-white photosensitive material, which does not contain physical development nuclei, and an image reception sheet having a non-photosensitive layer, which contains physical development nuclei, are superposed one on the other and developed by way of diffusion transfer development in order to form a metal silver portion on the non-photosensitive image reception sheet.

The above-described form (1) is of an integral black-and-white development type, in which a light-permeable electroconductive film such as a translucent electroconductive film or the like is formed on a photosensitive material. The obtained developed silver is a chemically developed silver or a thermally developed silver, which exhibits high activity in a subsequent plating process or a physical development process, since the developed silver is provided as a filament having a high specific surface.

According to the above-described form (2), in the exposed areas, silver halide particles near the physical development nuclei are dissolved and deposited on the development nuclei in order to form a light-permeable electroconductive film such as a translucent electroconductive film or the like on a photosensitive material. Form (2) is also of an integral black-and-white development type. The developing action is highly active, since the silver is precipitated on the physical development nuclei. Further, the developed silver is of a spherical form having a small specific surface.

According to the above-described form (3), in the unexposed areas, silver halide particles are dissolved, diffused, and deposited on developed nuclei on an image reception sheet in order to form a light-permeable electroconductive film such as a translucent electroconductive film or the like on the image reception sheet. Form (3) is of a so-called separate type, in which the image reception sheet is used after the image reception sheet has been peeled off from the photosensitive material.

In association with any of the above forms, either one of a negative-type development process and an inversion-type development process may be selected. For the diffusion transfer development process, it is possible to carry out the negative-type development process using an autopositive photosensitive material as the photosensitive material.

The terms chemical development, thermal development, dissolution physical development, and diffusion transfer development referred to above have meanings given by terms as normally used in the field of the present invention. These terms are explained in general textbooks on photographic chemistry, e.g., "Photographic Chemistry" written by Sin'ichi Kikuchi (Kyoritsu Shuppan Co., Ltd., published 1955), and "The Theory of Photographic Processes, 4th ed." edited by C. E. K. Mees (Mcmillan, published 1977). Although the present invention is concerned with liquid treatment, reference may be made to technologies in which a thermal development process is applied as another development process. For example, the technologies disclosed in Japanese Laid-Open Patent Publication No. 2004-184693, Japanese Laid-Open Patent Publication No. 2004-334077, Japanese Laid-Open Patent Publication No. 2005-010752, Japanese Patent Application No. 2004-244080, and Japanese Patent Application No. 2004-085655 may be applied to the present invention.

The makeup of each of the layers of the electroconductive film 10 according to the present embodiment will be described in detail below.

[Transparent Base 12]

The transparent base 12 may comprise a plastic film, a plastic plate, a glass plate, or the like. The plastic film and the plastic plate may be made of a polyester such as polyethylene terephthalate (PET), polyethylene naphthalate (PEN), or the like, or triacetyl cellulose (TAC), polycarbonate, cyclic olefin polymer (COP), or the like. A plastic film or a plastic plate having a melting point equal to or less than approximately 290° C. is preferable for use as the transparent base 12. In particular, PET is preferable from the standpoint of light permeability, processability, etc.

[Silver Salt Emulsion Layer]

The silver salt emulsion layer, which is made into the metal thin lines 16 of the electroconductive film 10, contains additives such as a solvent, a dye, etc., in addition to a silver salt and a binder.

The silver salt that is used according to the present embodiment includes an inorganic silver salt such as a silver halide or the like, and an organic silver salt such as silver acetate or the like. According to the present embodiment, a silver halide, which exhibits excellent properties for use as an optical sensor, is preferable.

The amount of coated silver (amount of coated silver salt) of the silver salt emulsion layer preferably is in a range from 1-30 $g/m^2$ in terms of silver, more preferably, is in a range from 1-25 $g/m^2$, and much more preferably, is in a range from 5-20 $g/m^2$. An amount of coated silver in the above range allows the electroconductive film 10 to achieve a desired surface resistance.

The binder that is used according to the present embodiment includes, for example, gelatin, polyvinyl alcohol (PVA), polyvinylpyrrolidone (PVP), a polysaccharide such as starch or the like, cellulose or its derivatives, polyethylene oxide, polyvinyl amine, chitosan, polylysine, polyacrylic acid, polyalginic acid, polyhyaluronic acid, carboxycellulose, or the like. Such materials exhibit neutral, anionic, and cationic properties, due to the ionicity of the functional group.

The amount of binder contained in the silver salt emulsion layer according to the present embodiment is not limited to any particular value, but may be determined appropriately within a range that is capable of exhibiting diffusing and adhering capabilities. The amount of binder contained in the silver salt emulsion layer preferably is equal to or greater than 1/4 in terms of a silver/binder volume ratio, and more preferably, is equal to or greater than 1/2. The silver/binder volume ratio preferably is equal to or less than 100/1, and more preferably, is equal to or less than 50/1. Further, the silver/binder volume ratio preferably is in a range of 1/1-4/1, and most preferably, is in a range of 1/1-3/1. The silver/binder volume ratio in the silver salt emulsion layer, which lies within the above ranges, is capable of suppressing variations in the resistance value, even if the amount of coated silver is adjusted. As a result, it is possible to obtain an electroconductive film 10 having a uniform surface resistance. The silver/binder volume ratio can be determined by converting [the amount of silver halide]/[the amount of binder] (weight ratio) of the raw material into [the amount of silver]/[the amount of binder] (weight ratio), and then converting [the amount of silver]/[the amount of binder] (weight ratio) into [the amount of silver]/[the amount of binder] (volume ratio).

<Solvent>

The solvent that is used to form the silver salt emulsion layer is not limited to any particular material, but may be water, an organic solvent (e.g., an alcohol such as methanol or the like, a ketone such as acetone or the like, an amide such as formamide or the like, a sulfoxide such as dimethyl sulfoxide or the like, an ester such as ethyl acetate or the like, or an ether), an ionic liquid, or a solvent made up from a mixture of such materials.

<Other Additives>

Various additives, which are used according to the present embodiment, are not limited to any particular materials. Known additives may be used as preferred.

[Other Layer Structures]

A non-illustrated protective layer may be provided on the silver salt emulsion layer, and an undercoat layer, for example, may be provided beneath the silver salt emulsion layer.

Steps of a method for manufacturing the electroconductive film 10 will be described below.

[Exposure]

The present embodiment includes formation of the electroconductive portion 14 by a printing process. Other than a printing process, the electroconductive portion 14 may be formed by way of exposure to light and development. More specifically, a photosensitive material having a silver salt containing layer on a transparent base 12, or a photosensitive material coated with a photolithographic photopolymer is exposed to light. The photosensitive material may be exposed to electromagnetic waves, which may be light such as visible light, ultraviolet radiation, or the like, or radiation such as X-rays or the like, for example. A light source having a specified wavelength distribution, or a light source having a particular wavelength may be used for exposing the photosensitive material.

[Development Process]

According to the present embodiment, after the emulsion layer has been exposed to light, a development process is carried out. The development process may be an ordinary development process used for silver salt photographic films, printing papers, printing plate films, and photomask emulsion masks, etc. According to the present embodiment, the development process may include a fixation process that is carried out for the purpose of removing a silver salt from unexposed areas to stabilize the photosensitive material. The fixation process according to the present invention may be based on the technology of a fixation process that is used for silver salt photographic films, printing papers, printing plate films, and photomask emulsion masks, etc.

Thereafter, the photosensitive material on which the development process and the fixation process have been carried out preferably is subjected to a water rinsing process and a stabilization process.

The weight of the metal silver contained in the exposed areas subsequent to the development process preferably is equal to or greater than 50% by weight with respect to the weight of silver contained in the exposed areas before being exposed to light, and more preferably, is equal to or greater than 80% by weight. The weight of silver contained in the exposed areas, which is equal to or greater than 50% by weight with respect to the weight of silver contained in the exposed areas before being exposed to light, is preferable, as such a feature achieves high electrical conductivity.

The electroconductive film 10 is obtained by carrying out the above steps. The electroconductive film 10, after having been processed by the development process, may further be subjected to a calendaring process. In a case where a calendaring process is performed, the surface resistance of each transparent electroconductive layer is adjusted to a desired surface resistance (within a range of 0.1-100 ohms/sq.).

[Physical Development and Plating Process]

According to the present embodiment, at least one of a physical development process and a plating process for enabling the metal silver areas to carry electroconductive metal particles may be carried out for the purpose of increasing the electroconductivity of the metal silver areas, which are produced by the exposure process and the development process. According to the present invention, electroconductive metal particles may be carried by the metal silver areas by either one or a combination of the physical development process and the plating process. The metal silver areas, which have been subjected to at least one of the physical development process and the plating process, will hereinafter be referred to as "electroconductive metal areas".

The physical development process according to the present embodiment refers to a process of reducing metal ions such as silver ions with a reducing agent in order to precipitate metal particles on metal or metal compound nuclei. The physical development process is used in the fabrication of instant B&W films, instant slide films, and printing plates. The present invention can employ such a technology. The physical development process may be carried out at the same time as the development process following exposure, or may be carried out separately from the development process following exposure.

According to the present embodiment, the plating process may be an electroless plating process (chemical reduction plating process or replacement plating process), an electrolytic plating process, or both an electroless plating process and an electrolytic plating process. According to the present embodiment, the electroless plating process may be based on a known electroless plating technology, e.g., an electroless plating technology used for printed wiring boards or the like. In particular, the electroless plating process preferably is an electroless copper plating process.

[Oxidization Process]

According to the present embodiment, an oxidization process preferably is carried out on the metal silver areas after processing thereof by the development process, and after formation of the electroconductive metal areas by at least one of the physical development process and the plating process. In a case where the oxidization process is performed, any traces of metal that may have been deposited on the light-permeable areas can be removed in order to allow the light-permeable areas to have a permeability of substantially 100%.

[Electroconductive Metal Areas]

According to the present embodiment, a value equal to or less than 30 μm can be selected for the line width of the electroconductive metal areas (line width of the metal thin lines 16). If the electroconductive film 10 is used in a touch panel, the line width of the metal thin lines 16 preferably is in a range from 0.1 μm to 15 μm, more preferably, is in a range from 1 μm to 9 μm, and much more preferably, is in a range from 2 μm to 7 μm. If the line width is less than the aforementioned lower limit values, then since electroconductivity is insufficient, the electroconductive film 10, if incorporated in a touch panel, has insufficient detection sensitivity. If the line width exceeds the aforementioned upper limit values, then moire patterns caused by the electroconductive metal areas become distinctive, or the visibility of the electroconductive film 10, if incorporated in a touch panel, becomes poor. A line width that falls within the above ranges improves the appearance of moire phenomena caused by the electroconductive metal areas, and in particular, significantly improves visibility. The length of the sides of the cells preferably is in a range from 100 μm to 800 μm, more preferably, is in a range from 100 μm to 400 μm, much more preferably, is in a range from 150 μm to 300 μm, and most preferably, is in a range from 210 μm to 250 μm. The electroconductive metal areas may have portions having a line width greater than 200 μm for the purpose of establishing ground connections or the like.

According to the present embodiment, the electroconductive metal areas have an aperture ratio, which preferably is equal to or greater than 80%, more preferably, is equal to or greater than 85%, and most preferably, is equal to or greater than 90%. The aperture ratio refers to the ratio of the light-permeable areas, with the exception of the metal thin lines, to the overall film.

[Light-Permeable Areas]

According to the present embodiment, the light-permeable areas refer to a portion of the electroconductive film 10, apart from the electroconductive metal areas, which is permeable to light. The exposure process preferably is a process using a glass mask, or a pattern exposure process based on laser image plotting.

[Electroconductive Film 10]

According to the present embodiment, the thickness of the transparent base 12 of the electroconductive film 10 preferably is in a range from 5 to 350 μm, and more preferably, is in a range from 30 to 150 μm. A thickness in a range from 5 to 350 μm allows the electroconductive film 10 to have a desired permeability to visible light and to be handled with ease.

The thickness of the metal silver areas on the transparent base 12 can be determined appropriately depending on the coated thickness of a coating for the silver salt containing layer on the transparent base 12. Although a value in a range of 0.001-0.2 mm can be selected for the thickness of the metal silver areas, the thickness of the metal silver areas preferably is equal to or less than 30 μm, more preferably, is equal to or less than 20 μm, much more preferably, is in a range of 0.01-9 μm, and most preferably, is in a range of 0.05-5 μm. The metal silver areas preferably are shaped in a pattern. The metal silver areas may be provided in one layer, or may be of a multi-layered structure including two or more layers. If the metal silver areas are shaped in a pattern and are constituted as a multi-layered structure including two or more layers, then different color sensitivities can be imparted to the metal silver areas in order to make the metal silver areas sensitive to different wavelengths. The different color sensitivities, which are imparted to the metal silver areas, make it possible to form different patterns in the respective layers in a case where the metal silver areas are exposed to different exposure wavelengths.

The thickness of the electroconductive metal areas that are used in the touch panel 100 preferably is thinner, as it provides a wider angle of view for the display panel 110. The electroconductive metal areas are also required to be thinner for the purpose of increasing visibility. From these points of view, the thickness of the layer of the electroconductive metal, which is carried by the electroconductive metal areas, preferably is less than 9 μm, more preferably, is in a range from 0.1 μm to less than 5 μm, and much more preferably, is in a range from 0.1 μm to less than 3 μm.

According to the present embodiment, metal silver areas having a desired thickness can be formed by controlling the coated thickness of the silver salt containing layer referred to above. In addition, the thickness of the layer made up of electroconductive metal particles can freely be controlled by at least one of the physical development process and the plating process. Therefore, an electroconductive film having a thickness of less than 5 μm, and more preferably, less than 3 μm can easily be formed.

The method of manufacturing the electroconductive film 10 according to the present embodiment need not necessarily include certain steps, such as a plating step, because with the method of manufacturing the electroconductive film 10 according to the present embodiment, a desired surface resistance can be obtained by adjusting the silver/binder volume ratio and the coated amount of silver in the silver salt emulsion layer. If necessary, a calendaring process, etc., may be carried out.

(Film Hardening Process after Development Process)

After the development process has been carried out on the silver salt emulsion layer, a film hardening process preferably is carried out by immersing the silver salt emulsion layer in a film hardener. The film hardener may be, for example, a dialdehyde such as glutaraldehyde, adipaldehyde, 2,3-dihydroxy-1,4-dioxane, or the like, or boric acid, as disclosed in Japanese Laid-Open Patent Publication No. 02-141279.

According to the present embodiment, a functional layer such as a reflection prevention layer, a hardcoat layer, or the like may be added to the electroconductive film 10.

[Calendaring Process]

The metal silver areas, which have been processed by the development process, may be smoothed by a calendaring process in order to significantly increase the electroconductivity of the metal silver areas. The calendaring process may be carried out by a calendar roll assembly, which typically is made up from a pair of rolls.

The rolls that are used in the calendaring process comprise plastic rolls made of epoxy, polyimide, polyamide, polyimideamide, or the like, or metal rolls. If the metal silver areas have emulsion layers on both surfaces thereof, then the metal silver areas should be processed by metal rolls. If the metal silver areas have an emulsion layer on one surface thereof, then the metal silver areas may be processed by a combination of metal and plastic rolls in order to prevent wrinkling of the metal silver areas. An upper limit for the line pressure is in a range from a value equal to or greater than 1960 N/cm (200 kgf/cm, or 699.4 kgf/cm$^2$ in terms of surface pressure), and more preferably, is equal to or greater than 2940 N/cm (300 kgf/cm, or 935.8 kgf/cm$^2$ in terms of surface pressure), to a value equal to or less than 6880 N/cm (700 kgf/cm).

A smoothing process that is typically carried out by calendar rolls preferably is performed at a temperature in a range from 10° C. (with no temperature control) to 100° C. A more preferable temperature is approximately in a range from 10° C. (with no temperature control) to 50° C., depending on the line density and shape of the metal mesh pattern or metal interconnect pattern and the type of the binder.

The present invention can appropriately be combined with the technologies disclosed in the following Japanese.

Laid-Open Patent Publications and PCT International Publications listed in Table 1 and Table 2 below. In the following tables, conventional notations such as "Japanese Laid-Open Patent Publication No.", "Publication No.", and "Pamphlet No.", etc., have been omitted.

TABLE 1

| | | | | |
|---|---|---|---|---|
| 2004-221564 | 2004-221565 | 2007-200922 | 2006-352073 | 2006-228469 |
| 2007-235115 | 2007-207987 | 2006-012935 | 2006-010795 | 2007-072171 |
| 2006-332459 | 2009-21153 | 2007-226215 | 2006-261315 | 2006-324203 |
| 2007-102200 | 2006-228473 | 2006-269795 | 2006-336090 | 2006-336099 |
| 2006-228478 | 2006-228836 | 2007-009326 | 2007-201378 | 2007-335729 |
| 2006-348351 | 2007-270321 | 2007-270322 | 2007-178915 | 2007-334325 |
| 2007-134439 | 2007-149760 | 2007-208133 | 2007-207883 | 2007-013130 |
| 2007-310091 | 2007-116137 | 2007-088219 | 2008-227351 | 2008-244067 |
| 2005-302508 | 2008-218784 | 2008-227350 | 2008-277676 | 2008-282840 |
| 2008-267814 | 2008-270405 | 2008-277675 | 2008-300720 | 2008-300721 |
| 2008-283029 | 2008-288305 | 2008-288419 | 2009-21334 | 2009-26933 |
| 2009-4213 | 2009-10001 | 2009-16526 | 2008-171568 | 2008-198388 |
| 2008-147507 | 2008-159770 | 2008-159771 | 2008-235224 | 2008-235467 |
| 2008-218096 | 2008-218264 | 2008-224916 | 2008-252046 | 2008-277428 |
| 2008-241987 | 2008-251274 | 2008-251275 | 2007-129205 | |

TABLE 2

| | | | | |
|---|---|---|---|---|
| 2006/001461 | 2006/088059 | 2006/098333 | 2006/098336 | 2006/098338 |
| 2006/098335 | 2006/098334 | 2007/001008 | | |

INVENTIVE EXAMPLES

The present invention will be described more specifically below with respect to Inventive Examples according to the present invention. Materials, ratios, processing details, processing procedures, etc., described in the Inventive Examples below can be changed, unless the changes depart from the scope of the present invention. Therefore, the present invention should not be interpreted as being restricted by the specific examples shown below.

In the present embodiment, electroconductive films according to Inventive Examples 1 through 8 and Comparative Examples 1 through 4 were evaluated for moire improving effect, visibility, randomness, and aperture ratio. The results of the evaluation are shown in Table 3, which will be described later.

Examples 1 Through 8 and Comparative Examples
1 Through 4

Photosensitive Silver Halide Material

An emulsion was prepared, which contained iodine bromine silver chloride particles (I=0.2 mole %, Br=40 mole %) having an average sphere equivalent diameter of 0.1 μm, in an aqueous medium containing 10.0 g of gelatin per 150 g of Ag contained therein.

$K_3Rh_2Br_9$ and $K_2IrCl_6$ were added to the emulsion at a concentration of $10^{-7}$ (mole/mole silver), thereby doping silver bromide particles with Rh ions and Ir ions. $Na_2PdCl_4$ was added to the emulsion. The emulsion was subjected to gold sulfur sensitization using chlorauric acid and sodium thiosulfate. Thereafter, a transparent base (polyethylene terephthalate (PET)) was coated with the emulsion to an extent at which the coated amount of silver was 10 g/m², as well as a gelatin film hardener, thereby providing a photosensitive silver halide material. The Ag/gelatin volume ratio was 2/1.

(Exposure)

The photosensitive silver halide material was exposed to light in exposure patterns determined respectively for Inventive Examples 1 through 8 and Comparative Examples 1 through 4. Exposure was carried out using parallel light emitted from a high-pressure mercury lamp as a light source, and the light was applied through photomasks having the above patterns.

(Development Process)

Formula for 1 L of the Development Liquid:

| | |
|---|---|
| Hydroquinone | 20 g |
| Sodium sulfite | 50 g |
| Potassium carbonate | 40 g |
| Ethylenediaminetetraacetic acid | 2 g |
| Potassium bromide | 3 g |
| Polyethylene glycol 2000 | 1 g |
| Potassium hydrate | 4 g |
| pH | adjusted to 10.3 |

Formula for 1 L of the Fixation Liquid:

| | |
|---|---|
| Ammonium thiosulfate solution (75%) | 300 ml |
| Ammonium sulfite monohydrate | 25 g |
| 1,3-diaminopropanetetraacetic acid | 8 g |
| Acetic acid | 5 g |
| Ammonia water (27%) | 1 g |
| pH | adjusted to 6.2 |

Using the above processing agents, the exposed photosensitive material was processed using an automatic developing machine FG-710PTS manufactured by FUJIFILM Corporation, under conditions of 35° C. and 30 seconds for development, 34° C. and 23 seconds for fixation, and 20 seconds for rinsing with running water (5 L/minute).

Inventive Example 1

FIG. 10A

As shown in FIG. 10A, the cell 28 is of a square shape, and metal thin lines 16 making up the cells 28 have a line with of 5 μm. The cell 28 has a resistivity of $4.16 \times 10^{-7}$ ohms/sq., and an average cell size Lsave of 212.1 μm. The lengths Ld of the sides of the cells 28 were selected from within a range of 138-162 μm in a continuous uniform distribution, with an average length Ld of 150 μm and a random ratio of 8%. The transparent electroconductive layer 18 has a maximum electrode width Lmax of 1.6 mm, and a minimum electrode width Lmin of 1.0 mm. Therefore, the average cell size Lsave is 1/4.71 of the minimum electrode width Lmin. Although the transparent electroconductive layers 18 are illustrated as being defined by profile lines (solid lines), such profile lines do not actually exist. The same convention will apply to the other examples described hereinbelow.

The average cell size was determined in the following manner. As shown in FIG. 10A, an SEM image was acquired of three electrodes (electrodes 1 through 3) arranged successively along one direction. All of the cell sizes of the three electrodes were determined from the SEC image, the total value thereof was calculated, and the total value was divided by the number of the cells in order to determine an average cell size. The minimum electrode width was determined in the following manner. All the minimum electrode widths were determined from the SEM image of the three electrodes, and the total value thereof was calculated. The total value was divided by the number of the electrodes (three electrodes) in order to determine a minimum electrode width. The same calculation processes were also used in Inventive Examples 2 through 8 and Comparative Examples 1 through 4, to be described below.

In the following description, a region that extends from the widest portion 26b to the gradually narrower portion 26c is referred to as a "specific region".

The ratio (referred to as a "ratio of average cell sizes" in Table 3) of the average cell size Lsave of a plurality of cells 28 that make up the specific region to the average cell size Lsave of a plurality of cells 28 that make up the narrowest portion 26a was in a range of 0.9-1.1.

In this case, the average cell size Lsave of the plurality of cells 28 that make up the specific region and the average cell size Lsave of the plurality of cells 28 that make up the narrowest portion 26a were also determined from an SEM image of three electrodes (electrodes 1 through 3), which were arranged successively along one direction, by an image processing technique and average value calculations, and thus, a ratio of the above average cell sizes was determined.

Inventive Example 2

Inventive Example 2 differs from Inventive Example 1 in that the average cell size Lsave is 200.0 μm, which is 1/5 of the minimum electrode width Lmin. The lengths Ld of the sides of the cells 28 were selected from within a range of 130-152 μm in a continuous uniform distribution, with a standard length of 141 μm and a random ratio of 8%.

Inventive Example 3

Inventive Example 3 differs from Inventive Example 1 in that the average cell size Lsave is 100.0 μm, which is 1/10 of the minimum electrode width Lmin. The lengths Ld of the sides of the cells 28 were selected from within a range of 65-77 μm in a continuous uniform distribution, with a standard length of 71 μm and a random ratio of 8%.

Inventive Example 4

Inventive Example 4 differs from Inventive Example 1 in that the random ratio is 10%. Therefore, the lengths Ld of the sides of the cells 28 were selected from within a range of 135-165 μm in a continuous uniform distribution.

Inventive Example 5

Figure 10B:
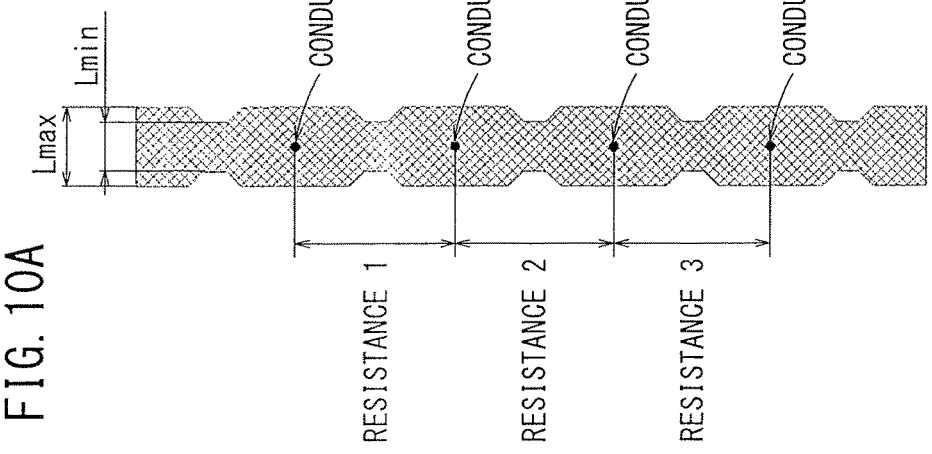
FIG. 10B is a plan view showing by way of example a pattern of a transparent electroconductive layer of an electroconductive film according to Inventive Example 5.

As shown in FIG. 10B (at a different scale from FIG. 10A), Inventive Example 5 differs from Inventive Example 1 in that the random ratio is 20%. Therefore, the lengths Ld of the sides of the cells 28 were selected from within a range of 120-180 μm in a continuous uniform distribution.

Inventive Example 6

Inventive Example 6 differs from Inventive Example 1 in that the random ratio is 2%. Therefore, the lengths Ld of the sides of the cells 28 were selected from within a range of 147-153 μm in a continuous uniform distribution.

Inventive Example 7

Inventive Example 7 differs from Inventive Example 1 in that the random ratio is 25%. Therefore, the lengths Ld of the sides of the cells 28 were selected from within a range of 113-187 μm in a continuous uniform distribution.

Inventive Example 8

Inventive Example 8 differs from Inventive Example 1 in that the random ratio is 1%. Therefore, the lengths Ld of the sides of the cells 28 were selected from within a range of 149-151 μm in a continuous uniform distribution.

Comparative Example 1

Figure 11A:
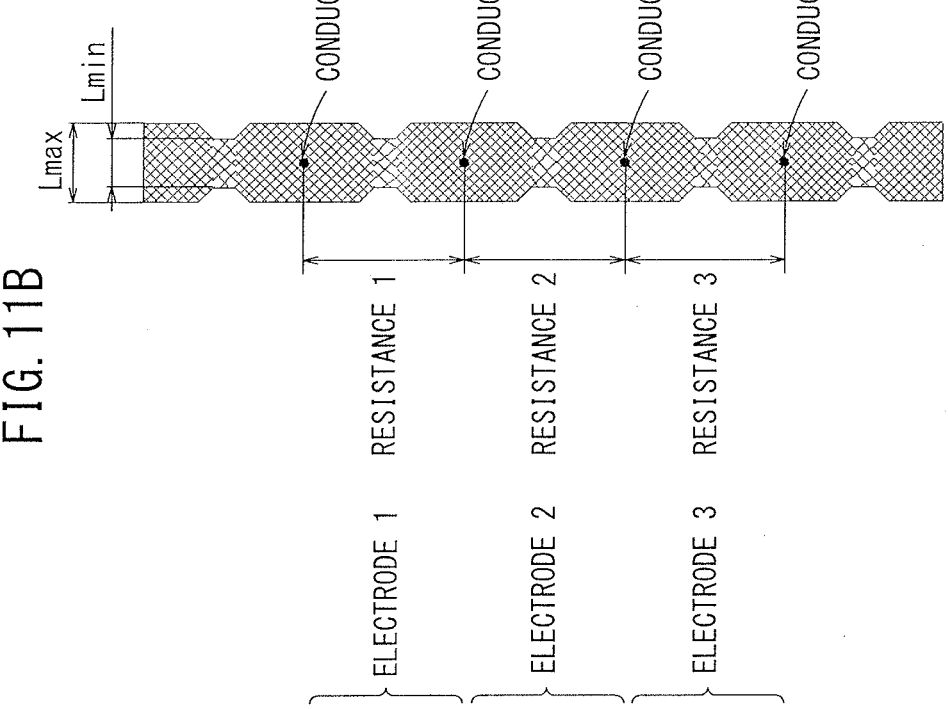
FIG. 11A is a plan view showing by way of example a pattern of a transparent electroconductive layer of an electroconductive film according to Comparative Example 1.

As shown in FIG. 11A, Comparative Example 1 differs from Inventive Example 1 in that the random ratio is 0% and the cell sizes Ls are uniform.

Comparative Example 2

Figure 11B:
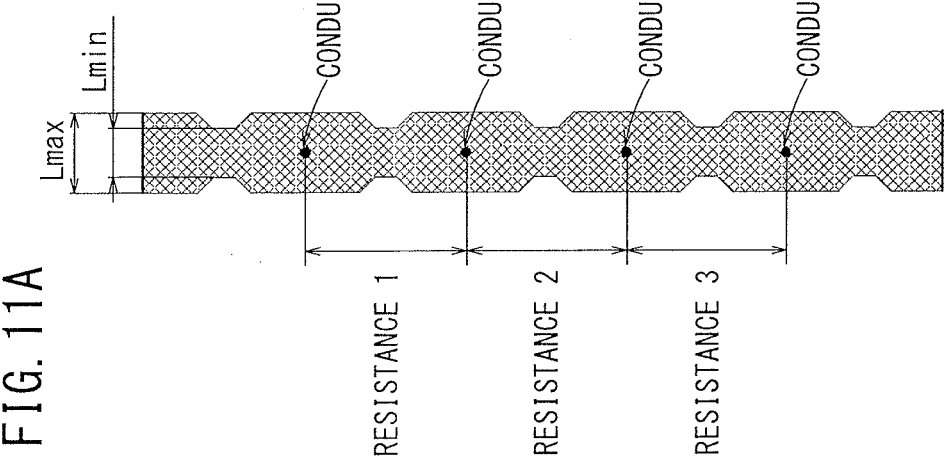
FIG. 11B is a plan view showing by way of example a pattern of a transparent electroconductive layer of an electroconductive film according to Comparative Example 2.

Comparative Example 2 differs from Inventive Example 1 in the following manner. As shown in FIG. 11B (at a different scale from FIG. 11A), the average cell size Lsave of a plurality of cells 28 making up the specific region is 212.1 μm. The average cell size Lsave of a plurality of cells 28 making up the narrowest portion 26a is 282.8 μm. In Table 3, the average cell sizes are indicated by "212.1 (282.8)". The ratio of these sizes (the ratio of the average cell sizes) is 1.33. The average cell size Lsave (the average cell size of the narrowest portion 26a) is 1/3.54 of the minimum electrode width Lmin.

Comparative Example 3

As indicated by a portion of the electrode 26 shown in FIG. 12A, Comparative Example 3 differs from Inventive Example 1, in that the average cell size Lsave is 28.3 μm, which is 1/35.3 of the minimum electrode width Lmin.

Comparative Example 4

As shown in FIG. 12B, Comparative Example 4 differs from Inventive Example 1, in that the average cell size Lsave is 353.5 μm, which is 1/2.8 of the minimum electrode width Lmin.

[Evaluation]
(Calculation of Aperture Ratio)

In order to confirm whether transparency was good or not, the permeability of the electroconductive films 10 for each of Inventive Examples 1 through 8 and Comparative Examples 1 through 4 was measured using a spectrophotometer, and the aperture ratio was calculated using proportional calculations.

(Evaluation of Visibility)

After the electroconductive films 10 for each of Inventive Examples 1 through 8 and Comparative Examples 1 through 4 were applied to the display panel 110 of the display device 108, the display device 108 was energized to display a white color. The displayed white color was confirmed in order to evaluate, with the naked eye, if thick lines and black spots were present, and whether or not a mottled pattern was distinctive. Visibility was assessed as "A", "B", and "C" in descending order, with "A" representing the best visibility.

(Evaluation of Moire Phenomena)

After the electroconductive films 10 for each of Inventive Examples 1 through 8 and Comparative Examples 1 through 4 were applied to the display panel 110 of the display device 108, the display device 108 was installed on a rotary table, and the display device 108 was energized to display a white color. The rotary table was rotated between bias angles in a range of −20° to +20°, and moire patterns were visually observed and evaluated.

Moire patterns were evaluated at an observation distanced of 0.5 m from the display screen of the display device 108. In a case where no moire patterns were visible, the result was represented by α. In a case where moire patterns were observed at a trouble-free level, the result was represented by β. In a case where moire patterns were visible, the result was represented by γ. A comprehensive assessment result of A was given in a case where the angular range for α was equal to or greater than 10°, a comprehensive assessment result of B was given in a case where the angular range for α was less than 10°, a comprehensive assessment result of C was given in a case where there was no angular range for α and the angular range for γ was less than 30°, and a comprehensive assessment result of D was given in a case where there was no angular range for α and the angular range for γ was equal to or greater than 30°.

(Evaluation of Randomness)

As shown in FIGS. 10A through 11B, 12B, etc., conductors (conductors a through d), each having a diameter of 0.2 mm, were positioned centrally at ends of the three electrodes (electrodes 1 through 3), which were arranged successively along one direction. Thereafter, a resistance 1 between the conductor a and the conductor b, a resistance 2 between the conductor b and the conductor c, and a resistance 3 between the conductor c and the conductor d were measured, respectively. The resistance variation was determined according to the following equation, where Rmax represents the maximum value, Rmin represents the minimum value, and Rave represents the average value of the resistance values of the three electrodes.

$$\text{Resistance variation (\%)} = \{(R\text{max}-R\text{min})/R\text{ave}\} \times 100$$

The resistance variation was used to indicate the result of the evaluation of randomness. The smaller the resistance variation is, the better randomness becomes.

the other Inventive Examples. Such slightly distinctive mesh-like irregularities affected the resistance variation, which was slightly greater than in the other Inventive Examples, although the resistance variation was of a practically trouble-free level. Although Inventive Example 7 also exhibited slightly distinctive mesh-like irregularities compared with the other Inventive Examples (Inventive Examples 1 through 4 and 6), Inventive Example 7 exhibited a moire improvement effect assessed as B (good), a good resistance variation of 6.0%, and an aperture ratio equal to or greater than 90%. Although Inventive Example 8 exhibited a moire improvement effect assessed as C compared with the other Inventive Examples (Inventive Examples 1 through 4 and 6), Inventive Example 8 exhibited good visibility, a good resistance variation of 0.5%, and an aperture ratio equal to or larger than 90%.

Comparative Example 1 exhibited the lowest moire improvement effect, as the random ratio was 0%. Comparative example 2 exhibited distinctive boundaries between gradually narrower portions and narrowest portions, and a mottled pattern that was visually recognizable, as the ratio of average cell sizes referred to above was 1.33. Among the aperture ratios 94.7% (96.0%), 94.7% represents an aperture ratio of the specific region referred to above, and 96.0% represents an aperture ratio of the narrowest portion 26a. Although comparative Example 3 exhibited a good moire improvement effect and a good resistance variation, Example 3 exhibited a low aperture ratio of 60.0% and poor visibility, and in particular, the transparency thereof was found not to be of a practical level. Although Comparative Example 4 exhibited a good moire improvement effect, good visibility, and a good aperture ratio, Example 4 exhibited a large resistance variation of 32.2%, and problems were encountered concerning the detection accuracy with which the touched positions were detected.

It should be understood from the above description that the present invention has the following features. The average

TABLE 3

| | Average | | | | Assessment results | | | |
|---|---|---|---|---|---|---|---|---|
| | cell size Lave (μm) | Random ratio (%) | Lsave/Lmin | Ratio of average cell sizes | Moire improvement effect | Visibility | Resistance variation (%) | Aperture ratio (%) |
| In. Ex. 1 | 212.1 | 8 | 1/4.71 | 0.9-1.1 | B | A | 4.0 | 94.7 |
| In. Ex. 2 | 200.0 | 8 | 1/5 | 0.9-1.1 | B | A | 3.8 | 93.5 |
| In. Ex. 3 | 100.0 | 8 | 1/10 | 0.9-1.1 | B | A | 3.0 | 92.6 |
| In. Ex. 4 | 212.1 | 10 | 1/4.71 | 0.9-1.1 | B | A | 4.5 | 94.7 |
| In. Ex. 5 | 212.1 | 20 | 1/4.71 | 0.9-1.1 | A | B | 5.2 | 94.7 |
| In. Ex. 6 | 212.1 | 2 | 1/4.71 | 0.9-1.1 | B | A | 1.0 | 94.7 |
| In. Ex. 7 | 212.1 | 25 | 1/4.71 | 0.9-1.1 | B | B | 6.0 | 94.7 |
| In. Ex. 8 | 212.1 | 1 | 1/4.71 | 0.9-1.1 | C | A | 0.5 | 94.7 |
| Com. Ex. 1 | 212.1 | 0 | 1/4.71 | 0.9-1.1 | D | A | 1.0 | 94.7 |
| Com. Ex. 2 | 212.1 (282.8) | 8 | 1/3.54 | 1.33 | B | C | 6.3 | 94.7 (96.0) |
| Com. Ex. 3 | 28.3 | 8 | 1/35.3 | 0.9-1.1 | B | C | 0.4 | 60.0 |
| Com. Ex. 4 | 353.5 | 8 | 1/2.8 | 0.9-1.1 | B | A | 32.2 | 96.8 |

From Table 3, it can be seen that each of Inventive Examples 1 through 4 and 6 exhibited a moire improvement effect assessed as B (good) and good visibility. The resistance variation was also good, as being equal to or less than 5.0%, and the aperture ratio was equal to or greater than 90%. Inventive Example 5 exhibited the best improvement effect, which was assessed as A. However, since the random ratio thereof was 20%, Inventive Example 5 exhibited slightly distinctive mesh-like irregularities compared with cell size Lsave preferably is equal to or greater than 1/30 and less than 1/3 of the minimum electrode width Lmin, more preferably, is equal to or greater than 1/10 and less than 1/3 of the minimum electrode width Lmin, and much more preferably, is equal to or greater than 1/5 and less than 1/3 of the minimum electrode width Lmin. The random ratio of sides of the cells 28 preferably is in a range from 2% to 20%, more preferably, is in a range from 4% to 10%, and much more preferably, is in a range from 6% to 8%. The ratio of the average cell size Lsave of a plurality of cells 28 making up a specific region of the electrodes 26 and the average cell size Lsave of a plurality of cells 28 making up the narrowest portion 26a of the electrodes 26 is in a range of 0.9-1.1.

Touch panels of the projection-type electrostatic capacitance type were fabricated using the electroconductive films according to Inventive Examples 1 through 6. In a case where the touch panels were operated as a result of being touched by a finger, it was found that the touch panels exhibited a high response speed and excellent detection sensitivity. In a case where the touch panels were operated as a result of being touched at two or more spots, similarly good results were obtained, thereby confirming that the touch panels were compatible with multiple touch operations.

The electroconductive film according to the present invention is not limited to the above embodiments, and various alternative arrangements may be incorporated therein without departing from the scope of the invention as set forth in the appended claims.

The invention claimed is:

1. An electroconductive film comprising:
   a transparent electroconductive layer having a plurality of electrodes extending along one direction;
   wherein:
   electrode widths of the electrodes are irregular depending on locations thereof, and the electrodes are made up of a plurality of polygonal cells of metal thin lines;
   the cells are not uniform in size;
   the cells have an average size, which is equal to or greater than 1/30 and less than 1/3 of a smallest width of the electrodes; and
   the average size of the cells is uniform in the electrodes in their entirety.

2. The electroconductive film according to claim 1, wherein the average size of the cells is equal to or greater than 1/10 and less than 1/3 of the smallest width of the electrodes.

3. The electroconductive film according to claim 1, wherein the average size of the cells is equal to or greater than 1/5 and less than 1/3 of the smallest width of the electrodes.

4. The electroconductive film according to claim 1, wherein the electrodes have a smallest width in a range of 0.5-2.0 mm.

5. The electroconductive film according to claim 1, wherein a random ratio of sides of the cells is in a range from 2% to 20%.

6. The electroconductive film according to claim 1, wherein a random ratio of sides of the cells is in a range from 4% to 10%.

7. The electroconductive film according to claim 1, wherein a ratio of an average size of a plurality of cells making up a narrowest portion of the electrodes and an average size of a plurality of cells making up a portion of the electrodes except for the narrowest portion is in a range of 0.9-1.1.

8. The electroconductive film according to claim 1, wherein, on condition that a maximum value of resistance values of a plurality of arbitrarily selected electrodes is represented by $R$max, a minimum value thereof is represented by $R$min, and an average value thereof is represented by $R$ave, then a resistance variation as represented by $$\{(R\text{max}-R\text{min})/R\text{ave}\}\times 100$$

is less than 10%.

9. The electroconductive film according to claim 8, wherein the electrodes that are selected arbitrarily comprise three electrodes successively arranged in one direction.

10. The electroconductive film according to claim 1, wherein, on condition that a maximum value of resistance values of a plurality of arbitrarily selected electrodes is represented by $R$max, a minimum value thereof is represented by $R$min, and an average value thereof is represented by $R$ave, then a resistance variation as represented by $$\{(R\text{max}-R\text{min})/R\text{ave}\}\times 100$$

is less than 5%.

11. The electroconductive film according to claim 10, wherein the electrodes that are selected arbitrarily comprise three electrodes successively arranged in one direction.

12. The electroconductive film according to claim 1, wherein among the cells that make up the transparent electroconductive layer, cells which are connected to connectors that connect with interconnecting members have sizes identical to each other.

13. The electroconductive film according to claim 1, wherein a length of a side of each of the cells is in a range from 100 μm to 800 μm.

14. The electroconductive film according to claim 1, wherein the metal thin lines have a line width in a range from 0.1 μm to 15 μm.

* * * * *